United States Patent
Burberry et al.

(10) Patent No.: US 7,195,813 B2
(45) Date of Patent: Mar. 27, 2007

(54) MIXED ABSORBER LAYER FOR DISPLAYS

(75) Inventors: Mitchell S. Burberry, Webster, NY (US); Charles M. Rankin, Jr., Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 342 days.

(21) Appl. No.: 10/851,566

(22) Filed: May 21, 2004

(65) Prior Publication Data

US 2005/0259300 A1 Nov. 24, 2005

(51) Int. Cl.
- *B32B 7/02* (2006.01)
- *B32B 15/08* (2006.01)
- *B32B 18/00* (2006.01)
- *B32B 27/18* (2006.01)
- *B32B 27/36* (2006.01)

(52) U.S. Cl. ............... 428/212; 428/1.31; 428/1.5; 428/1.6; 428/213; 428/195; 428/209; 428/210; 428/323; 428/412; 428/457; 428/458; 428/459; 428/461; 428/463; 428/469; 428/472; 428/478.2; 428/480; 428/688; 428/689; 428/697; 428/702

(58) Field of Classification Search ............ None
See application file for complete search history.

(56) References Cited

U.S. PATENT DOCUMENTS 3,600,060 A * 8/1971 Chruchill et al. ............ 349/21
3,816,786 A * 6/1974 Churchill et al. ............ 313/400
4,435,047 A * 3/1984 Fergason .................... 349/86

(Continued)

FOREIGN PATENT DOCUMENTS

EP 1 225 471 7/2002

(Continued)

*Primary Examiner*—Vivian Chen
(74) *Attorney, Agent, or Firm*—Lynne M. Blank

(57) ABSTRACT

The present invention relates to a display and a method for making the display comprising a substrate, an electrically modulated imaging layer, a first transparent conductive layer, and a dark light absorbing layer comprising a binder and a blend of nonconductive colorants and conductive colorants, wherein the conductive colorant is present in an amount less than 25% by weight.

38 Claims, 5 Drawing Sheets

U.S. PATENT DOCUMENTS

| | | | |
|---|---|---|---|
| 5,066,107 A * | 11/1991 | Yoshinaga et al. | 349/183 |
| 5,251,048 A * | 10/1993 | Doane et al. | 345/87 |
| 5,329,390 A * | 7/1994 | Fujiwara et al. | 349/27 |
| 5,609,943 A * | 3/1997 | DeKoven et al. | 428/195.1 |
| 5,673,127 A * | 9/1997 | Takahara et al. | 349/140 |
| 5,913,617 A * | 6/1999 | Helstern | 40/564 |
| 6,005,651 A * | 12/1999 | Takahara et al. | 349/137 |
| 6,040,887 A * | 3/2000 | Matsuyama et al. | 349/141 |
| 6,049,364 A * | 4/2000 | Takahara et al. | 349/10 |
| 6,143,379 A * | 11/2000 | Schoenfeld et al. | 428/1.1 |
| 6,359,673 B1 * | 3/2002 | Stephenson | 349/185 |
| 6,476,783 B2 * | 11/2002 | Matthies et al. | 345/82 |
| 6,639,637 B2 * | 10/2003 | Stephenson | 349/86 |
| 6,788,362 B2 * | 9/2004 | Stephenson et al. | 349/86 |
| 6,818,261 B2 * | 11/2004 | Kawabata | 428/1.3 |
| 6,950,157 B2 * | 9/2005 | Stephenson et al. | 349/113 |
| 6,999,142 B2 * | 2/2006 | Stephenson et al. | 349/113 |
| 7,081,941 B2 * | 7/2006 | Umemoto et al. | 349/158 |
| 7,087,351 B2 * | 8/2006 | Aylward et al. | 430/20 |
| 2002/0050958 A1 * | 5/2002 | Matthies et al. | 345/55 |
| 2002/0089625 A1 * | 7/2002 | Grupp | 349/110 |
| 2004/0032545 A1 * | 2/2004 | Stephenson et al. | 349/86 |
| 2005/0110925 A1 * | 5/2005 | Chari et al. | 349/113 |
| 2005/0196584 A1 * | 9/2005 | Halecki et al. | 428/100 |
| 2005/0264725 A1 * | 12/2005 | Chari et al. | 349/113 |

FOREIGN PATENT DOCUMENTS

| | | |
|---|---|---|
| EP | 1 324 106 | 7/2003 |
| EP | 1 324 107 | 7/2003 |
| EP | 1 389 741 A2 * | 8/2003 |

* cited by examiner

MIXED ABSORBER LAYER FOR DISPLAYS

FIELD OF THE INVENTION

The present invention relates to the use of an absorber layer containing a combination of colorants in displays having electrically modulated imaging layers.

BACKGROUND OF THE INVENTION

Carbon is a useful absorber because it is panchromatic and has high optical density per weight coverage. It has the problem of causing field blooming when used in close proximity to segmented electrodes in a cholesteric liquid crystal display.

Carbon can also interfere with process steps in the manufacture of displays as for example when UV curable inks are used for conductive electrodes and traces and UV curable dielectrics are used to make insulating layers. The UV absorption of carbon reduces the actinic light in the curing unit and the unwanted UV and IR absorption causes excessive heating that can thermally transition the liquid crystal.

Currently, information is displayed using assembled sheets of paper carrying permanent inks or displayed on electronically modulated surfaces such as cathode ray displays or liquid crystal displays. Other sheet materials can carry magnetically written areas to carry ticketing or financial information, however magnetically written data is not visible.

Media systems exist that maintain electronically changeable data without power. Such system can be electrophoretic (Eink), Gyricon or polymer dispersed cholesteric materials. An example of electronically updateable display can be found in U.S. Pat. No. 3,600,060, that shows a device having a coated then dried emulsion of cholesteric liquid crystals in aqueous gelatin to form a field responsive, bistable display. U.S. Pat. No. 3,816,786 discloses a layer of encapsulated cholesteric liquid crystal responsive to an electric field. The electrodes in the patent can be transparent or nontransparent and formed of various metals or graphite. It is disclosed that one electrode must be light absorbing and it is suggested that the light absorbing electrode be prepared from paints containing conductive material such as carbon.

Fabrication of flexible, electronically written display sheets is disclosed in U.S. Pat. No. 4,435,047. A substrate supports a first conductive electrode, one or more layers of encapsulated liquid crystals, and a second electrode of electrically conductive ink. The conductive inks form a background for absorbing light, so that the display areas appear dark in contrast to non-display areas. Electrical potential applied to opposing conductive areas operates on the liquid crystal material to expose display areas. Because the liquid crystal material is nematic liquid crystal, the display ceases to present an image when de-energized.

The patent discloses the use of dyes in either the polymer encapsulant or liquid crystal material to absorb incident light. The dyes are part of a solution, and not solid submicron particles. The patent further discloses the use of a chiral dopant in example 2. The dopant improves the response time of the nematic liquid crystal, but does not create a light reflective state. The display structures disclosed are not bistable in the absence of an electrical field.

U.S. Pat. No. 5,251,048 discloses a light modulating cell having a polymer dispersed chiral nematic liquid crystal. The chiral nematic liquid crystal has the property of being electrically driven between a planar state reflecting a specific visible wavelength of light and a light scattering focal conic state. Chiral nematic liquid crystals, also known as cholesteric liquid crystals, have the capacity of maintaining one of multiple given states in the absence of an electric field. Black paint is applied to the outer surface of rear substrate to provide a light absorbing layer outside of the area defined by the intersection of segment lines and scanning lines.

U.S. Ser. No. 2002/0089625 to Grupp discloses disposing, in reflective liquid crystal display devices, the absorbent black layer which is usually deposited on the lower face of the back substrate, and arranging it at a higher level than the level of said back substrate. In this way, the number of so called parasite reflections or back scatter of the incident light at the interfaces between two materials or mediums of different indices is reduced. This allows the display contrast to be improved. Grupp discloses a polymer dispersed liquid crystal device having a first group of transparent electrodes and a second group of electrodes. A black colored absorbent layer made of electrically nonconductive material that is an insulating lacquer, Heatsinkpaste® HSP 2741 by Lack Verke GmbH. The invention of Grupp requires separate processes for depositing the absorbent black layer and the second conductor. In addition, there is no mention of providing an index match between the absorbent black layer and the polymer used in the polymer dispersed liquid crystal layer. It would be advantageous for the absorbent layer to be disposed between the polymer dispersed liquid crystal material and the second electrode, in order to maximize the light absorption.

U.S. Pat. Application Serial No. 2004/0032545 discloses a thin, dark light absorbing layer between two thinly spaced, parallel electrodes operating on polymer dispersed cholesteric liquid crystal displays, in which, if the light absorbing layer for a display having polymer dispersed cholesteric liquid crystals is not field carrying and not electrically conductive, it is possible to position such layer between electrodes to provide improved image quality. Accordingly, the light absorbing layer does not carry a field beyond limits defined by the intersection or overlap of the two electrodes. The disclosed display has polymer dispersed liquid crystals, comprising a transparent substrate, a polymer dispersed cholesteric liquid crystal disposed over the substrate and defining first and second surfaces, a first transparent conductor disposed over the first surface of the state changing layer, a second conductor on the second surface of the state changing layer, and a nonconductive, non-field spreading layer comprising a submicron pigment and binder disposed between the polymer dispersed cholesteric liquid crystal layer and the second conductor to provide a light absorbing layer. Fine, preferably submicron, particles of pigment in a binder provide an electro-chemically stable light absorber that maximizes light absorption in the pigment-containing layer, while preventing field spreading beyond the perimeter of the second electrode.

PROBLEM TO BE SOLVED

There remains a need for a display with a very high-density dark layer that is not subject to field bloom.

SUMMARY OF THE INVENTION

The present invention relates to a display and a method for making the display comprising a substrate, an electrically modulated imaging layer, a first transparent conductive layer, and a dark light absorbing layer comprising a binder and a blend of nonconductive colorants and conductive colorants, wherein the conductive colorant is present in an amount less than 25% by weight.

ADVANTAGEOUS EFFECT OF THE INVENTION

The present invention includes several advantages, not all of which are incorporated in a single embodiment. The dark layer of the present invention has better blackness than dark layers containing pigment alone. The dark layer of the present invention also does not contribute to field blooming, as with a layer containing carbon alone, at comparable weight coverage. In addition, the dark layer provides less ultraviolet (UV) and infrared (IR) absorption than carbon alone. Dark layers of the present invention are also more robust than conventional dark layers containing pigment colorants alone.

DETAILED DESCRIPTION OF THE INVENTION

Figure 1:
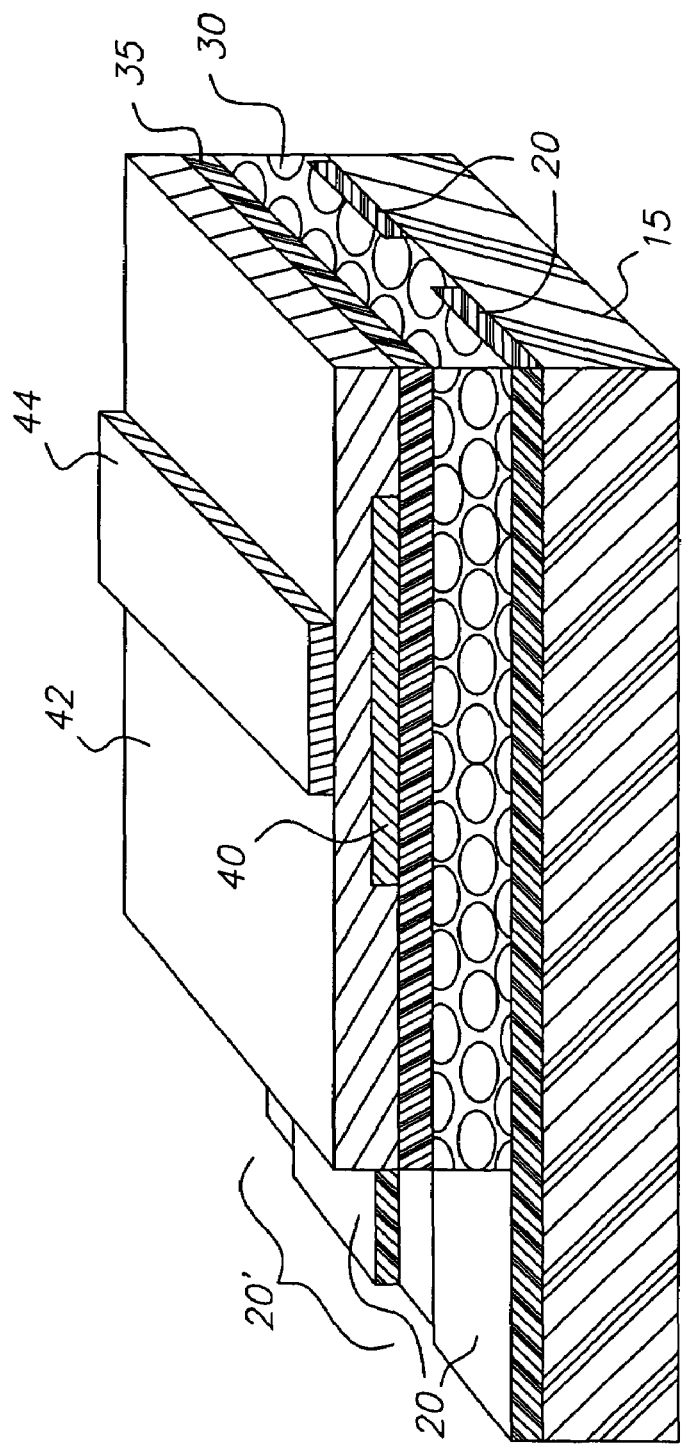
FIG. 1 is a perspective of a first polymer dispersed material display used with the present invention.

Making a neutral black using pigment colorants requires a blend of colors, for example red, green and blue absorbing pigment colorants. These pigment colorants can be chosen for high extinction coefficient and to minimize the unwanted absorption in the UV and IR spectral regions. The spectral purity of pigment colorants is however never perfect and mixtures often leave regions (spectral holes) of weaker absorption between the primary absorption maximums in the visible spectral region. This reduces the overall absorption and can lead to color shifts away from neutral under different lighting conditions. These problems can be minimized by adding additional colorant pigments with peak absorption wavelengths corresponding to the spectral holes however designing specialty colorant pigment systems that are compatible with coating or other application technologies can be difficult and expensive. Carbon pigments used alone are panchromatic but have higher unwanted absorption in the UV and IR spectral regions and field blooming is a recognized problem with segmented display structures.

The present invention combines nonconductive colorants having discrete absorption bands in the visible spectrum with conductive colorant, most preferably carbon, having a panchromatic absorption throughout the near UV, visible and near IR spectral regions. Organic and inorganic nonconductive colorants can be blended to make a wide variety of colors including black. They can be chosen to have little unwanted UV and IR absorptions, however, nonconductive colorant, typically pigments, tend to have spectral peaks making it difficult to formulate a mixture that absorbs panchromatically using a limited set of pigment colors. We have found that a useful color contrast layer, particularly a black layer, can be made by mixing colorants such as nonconductive colorants, preferably pigments, and conductive colorants, preferably carbon, where the conductive colorant component is limited to no more than 25% by weight. More preferably, the dark light absorbing layer comprises an amount of said conductive colorant greater than 0 but less than or equal to 22% by weight.

The present invention utilizes a dark, visible-light absorbing layer, frequently referred to in the art as a color contrast layer or a nano-pigmented layer. Color contrast layers may be radiation reflective layers or radiation absorbing layers. In some cases, the rearmost substrate of each display, that is, the side most opposite either the substrate or the viewer, is preferably painted black. The black layer absorbs infrared radiation that reaches the back of the display. In the case of the stacked cell display, the contrast may be improved by coloring the back substrate of the last visible cell black. The dark layer is preferably transparent to infrared radiation. This effectively provides the visible cell with a black background that improves its contrast, and yet, does not alter the viewing characteristics of the infrared display. Materials such as black paint, which is transparent in the infrared region, is known to those skilled in the art. For example, many types of black paint used to print the letters on computer keys are transparent to infrared radiation.

The dark layer may be positioned between the liquid crystal layer and at least one transparent conductive layer. In the embodiment where the display is viewed from a point opposite the substrate, the dark layer may be positioned between the substrate bearing a conductive layer and the electrically modulated layer. In this case, the substrate and conductive layer coated thereon need not be transparent. In another embodiment where the display is viewed through the substrate, the substrate and conductive layer is transparent and the dark layer is positioned on the side of the electrically modulated material opposite the substrate. In the fully evolved focal conic state, the chiral nematic liquid crystal is transparent, passing incident light, which is absorbed by the light absorber to create a black image. Progressive evolution of the focal conic state causes a viewer to perceive a reflected light that transitions to black as the chiral nematic material changes from planar state to a focal conic state. The transition to the light transmitting state is progressive, and varying the low voltage time permits variable levels of reflection. These variable levels may be mapped out to corresponding gray levels, and when the field is removed, the light modulating layer maintains a given optical state indefinitely. This process is more fully discussed in U.S. Pat. No. 5,437,811, incorporated herein by reference.

The color contrast layer may also contain other colors. In one embodiment, the dark layer comprises milled pigments. The materials are milled below 1 micron to form "nano-pigments". Such pigments are effective in absorbing wavelengths of light in very thin or "sub micron" layers. In a preferred embodiment, the dark layer absorbs all wavelengths of light across the visible light spectrum, that is, from 400 nanometers to 700 nanometers wavelength.

The dark layer contains a set or multiple nonconductive colorant pigments, frequently supplied as dispersions. For example, three different nonconductive colorant pigments, such as a Yellow pigment milled to median diameter of 120 nanometers, a magenta pigment colorant milled to a median diameter of 210 nanometers, and a cyan pigment colorant, such as Sunfast® Blue Pigment 15:4 pigment, milled to a median diameter of 110 nanometers are combined. A mixture of these three nonconductive colorant pigments produces a uniform light absorption across the visible spectrum.

Figure 2:
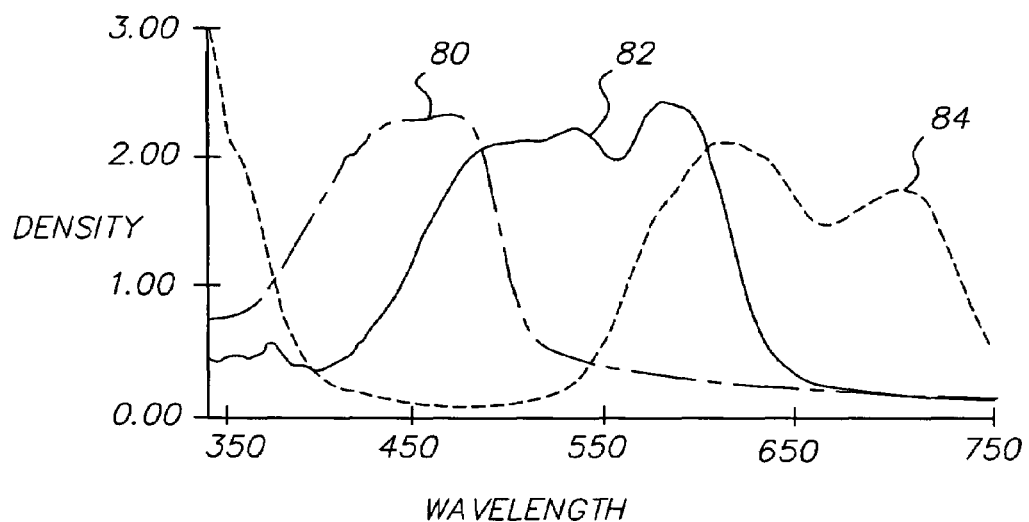
FIG. 2 is a set of spectra for various individual nonconductive pigment colorant dispersions according to the present invention.

FIG. 2 is an absorbance set of spectrum for colorant pigment dispersions. In the embodiment of FIG. 2, the three different colorant pigments are a Yellow pigment 80, which is a Pigment Yellow 74 milled to median diameter of 120 nanometers, a magenta pigment 82, which is a Pigment Violet 29 milled to a median diameter of 210 nanometers, and cyan pigment 84 is a Sunfast® Blue Pigment 15:4 pigment milled to a median diameter of 110 nanometers. However, any colorant pigment or colorant pigment combination may be used if compatible with the display components.

Suitable nonconductive colorant pigments are readily available and are designed to be light absorbing across the visible spectrum. In addition, suitable nonconductive colorants are inert and do not carry electrical fields. Colorants for use in the present invention may also include dye colorants, in addition to pigments.

Suitable nonconductive colorants used in the color contrast layer may be any colored materials, which are practically insoluble in the medium in which they are incorporated. The preferred nonconductive colorants are organic in which carbon is bonded to hydrogen atoms and at least one other element such as nitrogen, oxygen and/or transition metals. The hue of the organic nonconductive colorant, preferably a pigment, is primarily defined by the presence of one or more chromophores, a system of conjugated double bonds in the molecule, which is responsible for the absorption of visible light. Preferably, the dark light absorbing layer comprises a combination of at least two nonconductive colorants which have different hues. More preferably, the dark light absorbing layer comprises a combination one, two, or three different nonconductive colorants which have different hues. The dark light absorbing layer comprises a combination of nonconductive colorants that preferably provide a substantially neutral hue, preferably providing a background that is substantially neutral to the human eye.

Suitable nonconductive colorant pigments include those described in Industrial Organic Pigments: Production, Properties, Applications by W. Herbst and K. Hunger, 1993, Wiley Publishers. These include, but are not limited to, Azo Pigments such as monoazo yellow and orange, diazo, naphthol, naphthol reds, azo lakes, benzimidazolone, diazo condensation, metal complex, isoindolinone and isoindolinic, polycyclic pigments such as phthalocyanine, quinacridone, perylene, perinone, diketopyrrolo-pyrrole, and thioindigo, and anthriquinone pigments such as anthrapyrimidine, triarylcarbonium and quinophthalone. The preferred color of the pigment or pigment combination is black, so that when incorporated into the coating, it provides a high contrast background for an image in the display. Suitable colorant pigments used in this invention can be any colored materials which are practically insoluble in the medium in which they are incorporated.

Preferred pigments are the phthalocyanines such as Pigment Blue 15, 15:1, 15:3, 15:4 and 15:6, anthraquinones such as Pigment Blue 60, quinacridones such as Pigment Red 122, Azos such as Pigment Yellow 74 and Pigment Yellow 155, as listed in NPIRI Raw Materials Data Handbook, Vol. 4, Pigments, 1983, National Printing Research Institute. Pigment Yellow 4G and Pigment Yellow 4G VP2532 are also useful. These colorant pigments have a hue sufficient so that when combined in certain proportions, give an essentially neutral hue of the binder layer and are easily dispersed in an aqueous solution. Preferably, the dark layer in the display provides a background that provides a substantially neutral optical density such that there is variability of less than +/−20% from the mean optical density over at least 80% of the visible spectrum from 400 to 700 nm.

The conductive colorant, preferably carbon pigment colorant, for use in the present invention may be any carbon-based black material. Preferably, the material is a "nano-pigment", preferably less than a micron in diameter, more preferably less than 0.5 microns in diameter. Suitable conductive carbon colorants are referred to in the art as "carbon black." For example, carbon black CAS 001333-86-4 may be used. The ratio of nonconductive colorant to conductive colorant may vary from 99.9:0.01 to 75:25.

The colorants can be incorporated into the dark light absorbing layer by direct addition of the colorant to a coating melt by mixing the colorant with an aqueous medium containing gelatin or other hydrophilic colloid. The colorant can also be mixed with an aqueous solution of a water soluble or water dispersible surfactant or polymer, and passing the premix through a mill until the desired particle size is obtained. The mill can be any high energy device such as, for example, a colloid mill, or high pressure homogenizer. Alternatively, but less preferably, colorant pigments can also be dispersed in an organic solvent.

In the preferred embodiment, the colorant is dispersed in a binder in the form of a solid particle dispersion as follows. Such dispersions are formed by first mixing the colorant with an aqueous solution containing a water soluble or water dispersible surfactant or polymer to form a coarse aqueous premix, and adding the premix to a mill. The amount of water soluble or water dispersible surfactant or polymer can vary over a wide range, but is generally in the range of 0.01% to 100%, preferably about 0.3% to about 60%, and more preferably 0.5% to 50%, the percentages being by weight, based on the weight of the colorant useful in this application.

The mill can be for example, a ball mill, media mill, attritor mill, vibratory mill or the like. The mill is charged with the appropriate milling media such as, for example, beads of silica, silicon nitride, sand, zirconium oxide, yttria-stabilized zirconium oxide, alumina, titanium, glass, polystyrene, etc. The bead sizes typically range from 0.25 to 3.0 mm in diameter, but smaller media can be used if desired. The premix is milled until the desired particle size range is reached.

The solid colorant particles are subjected to repeated collisions with the milling media, resulting in crystal fracture, deagglomeration, and consequent particle size reduction. The solid particle dispersions of the colorant should have a final average particle size of less than the thickness of the dried dark layer, preferably less than 50 percent of the thickness of the dried dark layer. The particles should, therefore, have a median diameter of less than 2 microns, preferably between 0.01 and 2 micron, and most preferably between 0.01 and 1 micron. Most preferably, the median diameter of the solid colorant particles are of submicron or "nano-particle" average size. Solid particle median diameters of between 0.01 and 0.5 micron provides the best pigment utilization and have a reduction in unwanted light absorption compared to colorant pigments with a median particle size greater than 1 micron. By the term "nano-pigment particles" is meant that the median size of the particles is less than 1 micron, but that particles greater than 1 micron may be present.

Surfactants, polymers, and other additional conventional addenda may also be used in the dispersing process described herein in accordance with prior art solid particle dispersing procedures. Such surfactants, polymers and other addenda are disclosed in U.S. Pat. Nos. 5,468,598; 5,300,394; 5,278,037; 4,006,025; 4,924,916; 4,294,917; 4,940,654; 4,950,586; 4,927,744; 5,279,931; 5,158,863; 5,135,844; 5,091,296; 5,089,380; 5,103,640; 4,990,431; 4,970,139; 5,256,527; 5,089,380; 5,103,640; 4,990,431; 4,970,139; 5,256,527; 5,015,564; 5,008,179; 4,957,857; and 2,870,012, British Patent specifications Nos. 1,570,362 and 1,131,179 referenced above, the disclosures of which are hereby incorporated by reference, in the dispersing process of the colorants.

Additional surfactants or other water soluble polymers may be added after formation of the colorant dispersion, before or after subsequent addition of the colorant dispersion to an aqueous coating medium for coating onto an imaging element support. The aqueous medium preferably contains other compounds such as stabilizers and dispersants, for example, additional anionic, nonionic, zwitterionic, or cationic surfactants, and water soluble binders such as gelatin as is well known in the imaging art. The aqueous coating medium may further contain other dispersions or emulsions of compounds useful in imaging.

The nano-particles in such dispersions require high amounts of surfactant to prevent flocculation. Preferably, the binder for the dark layer according to the present invention is gelatin which binds up surfactant in the mixture used to create dark layer. If the gelatin concentration is too low high concentrations of surfactant on the surface of dark layer prevents subsequent layers from adhering to the surface of dark layer. The amount of binder in the coating must also be low to prevent an increase in drive voltage. It was found experimentally that the polymer binder, gelatin, should be provided at a 1:1 ratio with the colorant pigment to create a surface that has good bond strength to subsequent applied layers and minimize increases in drive voltage.

In application, the dark layer of the present invention should be as thin as possible to not increase drive voltage while providing an acceptable degree of light absorption. In the preferred embodiment, light modulating layer is between 4 and 10 microns thick. The state changing field for cholesteric materials is typically 10 volts per micron coating thickness. Because dark layer is disposed between the two field carrying conductors, the layer should be significantly thinner than the light modulating layer. In practice, dark layer should be less than 1.0 micron, preferably 0.5 microns or less in thickness. The thickness of the dark layer is preferably less that 25%, more preferably less than 10%, of the light modulating layer. It is of further use that the optical density of dark layer be high enough to obscure visible features behind dark layer. The target optical density for dark layer should be greater than 1.0 optical density and preferably 2.0 optical density.

In one embodiment, at least one imagable layer is applied to the support. The imageable layer can contain an electrically imageable material. The electrically imageable material can be light emitting or light modulating. Light emitting materials can be inorganic or organic in nature. The light modulating material can be reflective or transmissive. Light modulating materials can be electrochemical, electrophoretic, such as Gyricon particles, electrochromic, or liquid crystals. The liquid crystalline material can be twisted nematic (TN), super-twisted nematic (STN), ferroelectric, magnetic, or chiral nematic liquid crystals. Especially preferred are chiral nematic liquid crystals. The chiral nematic liquid crystals can be polymer dispersed liquid crystals (PDLC). Structures having stacked imaging layers or multiple support layers, however, are optional for providing additional advantages in some case.

In a preferred embodiment, the electrically imageable material can be addressed with an electric field and then retain its image after the electric field is removed, a property typically referred to as "bistable". Particularly suitable electrically imageable materials that exhibit "bistability" are electrochemical, electrophoretic, such as Gyricon particles, electrochromic, magnetic, or chiral nematic liquid crystals. Especially preferred are chiral nematic liquid crystals. The chiral nematic liquid crystals can be polymer dispersed liquid crystals (PDLC).

Most preferred is a support bearing a conventional polymer dispersed light modulating material. The liquid crystal (LC) is used as an optical switch. The supports are usually manufactured with transparent, conductive electrodes, in which electrical "driving" signals are coupled. The driving signals induce an electric field which can cause a phase change or state change in the LC material, the LC exhibiting different light reflecting characteristics according to its phase and/or state.

The electrically modulated material may also be a printable, conductive ink having an arrangement of particles or microscopic containers or microcapsules. Each microcapsule contains an electrophoretic composition of a fluid, such as a dielectric or emulsion fluid, and a suspension of colored or charged particles or colloidal material. The diameter of the microcapsules typically ranges from about 30 to about 300 microns. According to one practice, the particles visually contrast with the dielectric fluid. According to another example, the electrically modulated material may include rotatable balls that can rotate to expose a different colored surface area, and which can migrate between a forward viewing position and/or a rear nonviewing position, such as gyricon. Specifically, gyricon is a material comprised of twisting rotating elements contained in liquid filled spherical cavities and embedded in an elastomer medium. The rotating elements may be made to exhibit changes in optical properties by the imposition of an external electric field. Upon application of an electric field of a given polarity, one segment of a rotating element rotates toward, and is visible by an observer of the display. Application of an electric field of opposite polarity, causes the element to rotate and expose a second, different segment to the observer. A gyricon display maintains a given configuration until an electric field is actively applied to the display assembly. Gyricon particles typically have a diameter of about 100 microns. Gyricon materials are disclosed in U.S. Pat. No. 6,147,791, U.S. Pat. No. 4,126,854 and U.S. Pat. No. 6,055,091, the contents of which are herein incorporated by reference.

According to one practice, the microcapsules may be filled with electrically charged white particles in a black or colored dye. Examples of electrically modulated material and methods of fabricating assemblies capable of controlling or effecting the orientation of the ink suitable for use with the present invention are set forth in International Patent Application Publication Number WO 98/41899, International Patent Application Publication Number WO 98/19208, International Patent Application Publication Number WO 98/03896, and International Patent Application Publication Number WO 98/41898, the contents of which are herein incorporated by reference.

The electrically modulated material may also include material disclosed in U.S. Pat. No. 6,025,896, the contents of which are incorporated herein by reference. This material comprises charged particles in a liquid dispersion medium encapsulated in a large number of microcapsules. The charged particles can have different types of color and charge polarity. For example white positively charged particles can be employed along with black negatively charged particles. The described microcapsules are disposed between a pair of electrodes, such that a desired image is formed and displayed by the material by varying the dispersion state of the charged particles. The dispersion state of the charged particles is varied through a controlled electric field applied to the electrically modulated material. According to a preferred embodiment, the particle diameters of the microcapsules are between about 5 microns and about 200 microns, and the particle diameters of the charged particles are between about one-thousandth and one-fifth the size of the particle diameters of the microcapsules.

Further, the electrically modulated material may include a thermochromic material. A thermochromic material is capable of changing its state alternately between transparent and opaque upon the application of heat. In this manner, a thermochromic imaging material develops images through the application of heat at specific pixel locations in order to form an image. The thermochromic imaging material retains a particular image until heat is again applied to the material. Since the rewritable material is transparent, UV fluorescent printings, designs and patterns underneath can be seen through.

The electrically modulated material may also include surface stabilized ferrroelectric liquid crystals (SSFLC). Surface stabilized ferroelectric liquid crystals confining ferroelectric liquid crystal material between closely spaced glass plates to suppress the natural helix configuration of the crystals. The cells switch rapidly between two optically distinct, stable states simply by alternating the sign of an applied electric field.

Magnetic particles suspended in an emulsion comprise an additional imaging material suitable for use with the present invention. Application of a magnetic force alters pixels formed with the magnetic particles in order to create, update or change human and/or machine readable indicia. Those skilled in the art will recognize that a variety of bistable nonvolatile imaging materials are available and may be implemented in the present invention.

The electrically modulated material may also be configured as a single color, such as black, white or clear, and may be fluorescent, iridescent, bioluminescent, incandescent, ultraviolet, infrared, or may include a wavelength specific radiation absorbing or emitting material. There may be multiple layers of electrically modulated material. Different layers or regions of the electrically modulated material display material may have different properties or colors. Moreover, the characteristics of the various layers may be different from each other. For example, one layer can be used to view or display information in the visible light range, while a second layer responds to or emits ultraviolet light. The nonvisible layers may alternatively be constructed of non-electrically modulated material based materials that have the previously listed radiation absorbing or emitting characteristics. The electrically modulated material employed in connection with the present invention preferably has the characteristic that it does not require power to maintain display of indicia.

In a preferred embodiment of the present invention, the dark light absorbing layer is part of a display, particularly a liquid crystal display. As used herein, a "liquid crystal display" (LCD) is a type of flat panel display used in various electronic devices. At a minimum, an LCD comprises a substrate, at least one conductive layer and a liquid crystal layer. LCDs may also comprise two sheets of polarizing material with a liquid crystal solution between the polarizing sheets. The sheets of polarizing material may comprise a substrate of glass or transparent plastic. The LCD may also include functional layers.

The liquid crystal (LC) is used as an optical switch. The substrates are usually manufactured with transparent, conductive electrodes, in which electrical "driving" signals are coupled. The driving signals induce an electric field which can cause a phase change or state change in the LC material, the LC exhibiting different light reflecting characteristics according to its phase and/or state.

Liquid crystals can be nematic (N), chiral nematic (N*), or smectic, depending upon the arrangement of the molecules in the mesophase. Chiral nematic liquid crystal (N*LC) displays are typically reflective, that is, no backlight is needed, and can function without the use of polarizing films or a color filter.

Chiral nematic liquid crystal, which may also be referred to as cholesteric liquid crystal, refers to the type of liquid crystal having finer pitch than that of twisted nematic and super-twisted nematic used in commonly encountered LC devices. Chiral nematic liquid crystals are so named because such liquid crystal formulations are commonly obtained by adding chiral agents to host nematic liquid crystals. Chiral nematic liquid crystals may be used to produce bistable or multi-stable displays. These devices have significantly reduced power consumption due to their nonvolatile "memory" characteristic. Since such displays do not require a continuous driving circuit to maintain an image, they consume significantly reduced power. Chiral nematic displays are bistable in the absence of a field; the two stable textures are the reflective planar texture and the weakly scattering focal conic texture. In the planar texture, the helical axes of the chiral nematic liquid crystal molecules are substantially perpendicular to the substrate upon which the liquid crystal is disposed. In the focal conic state the helical axes of the liquid crystal molecules are generally randomly oriented. Adjusting the concentration of chiral dopants in the chiral nematic material modulates the pitch length of the mesophase and, thus, the wavelength of radiation reflected. Chiral nematic materials that reflect infrared radiation and ultraviolet have been used for purposes of scientific study. Commercial displays are most often fabricated from chiral nematic materials that reflect visible light. Some known LCD devices include chemically etched, transparent, conductive layers overlying a glass substrate as described in U.S. Pat. No. 5,667,853, incorporated herein by reference.

In one embodiment, a chiral nematic liquid crystal composition may be dispersed in a continuous matrix. Such materials are referred to as "polymer dispersed liquid crystal" materials or "PDLC" materials. Such materials can be made by a variety of methods. For example, Doane et al. (*Applied Physics Letters,* 48, 269 (1986)) disclose a PDLC comprising approximately 0.4 µm droplets of nematic liquid crystal 5CB in a polymer binder. A phase separation method is used for preparing the PDLC. A solution containing monomer and liquid crystal is filled in a display cell and the material is then polymerized. Upon polymerization the liquid crystal becomes immiscible and nucleates to form droplets. West et al. (Applied Physics Letters 63, 1471 (1993)) disclose a PDLC comprising a chiral nematic mixture in a polymer binder. Once again a phase separation method is used for preparing the PDLC. The liquid crystal material and polymer (a hydroxy functionalized polymethylmethacrylate) along with a crosslinker for the polymer are dissolved in a common organic solvent toluene and coated on an indium tin oxide (ITO) substrate. A dispersion of the liquid crystal material in the polymer binder is formed upon evaporation of toluene at high temperature. The phase separation methods of Doane et al. and West et al. require the use of organic solvents that may be objectionable in certain manufacturing environments.

The contrast of the display is degraded if there is more than a substantial monolayer of N*LC domains. The term "substantial monolayer" is defined by the Applicants to mean that, in a direction perpendicular to the plane of the display, there is no more than a single layer of domains sandwiched between the electrodes at most points of the display (or the imaging layer), preferably at 75 percent or more of the points (or area) of the display, most preferably at 90 percent or more of the points (or area) of the display. In other words, at most, only a minor portion (preferably less than 10 percent) of the points (or area) of the display has more than a single domain (two or more domains) between the electrodes in a direction perpendicular to the plane of the display, compared to the amount of points (or area) of the display at which there is only a single domain between the electrodes.

The amount of material needed for a monolayer can be accurately determined by calculation based on individual domain size, assuming a fully close packed arrangement of domains. In practice, there may be imperfections in which gaps occur and some unevenness due to overlapping droplets or domains. On this basis, the calculated amount is preferably less than about 150 percent of the amount needed for monolayer domain coverage, preferably not more than about 125 percent of the amount needed for a monolayer domain coverage, more preferably not more than 110 percent of the amount needed for a monolayer of domains. Furthermore, improved viewing angle and broadband features may be obtained by appropriate choice of differently doped domains based on the geometry of the coated droplet and the Bragg reflection condition.

In a preferred embodiment of the invention, the display device or display sheet has simply a single imaging layer of liquid crystal material along a line perpendicular to the face of the display, preferably a single layer coated on a flexible substrate. Such as structure, as compared to vertically stacked imaging layers each between opposing substrates, is especially advantageous for monochrome shelf labels and the like. Structures having stacked imaging layers, however, are optional for providing additional advantages in some case.

Preferably, the domains are flattened spheres and have on average a thickness substantially less than their length, preferably at least 50% less. More preferably, the domains on average have a thickness (depth) to length ratio of 1:2 to 1:6. The flattening of the domains can be achieved by proper formulation and sufficiently rapid drying of the coating. The domains preferably have an average diameter of 2 to 30 microns. The imaging layer preferably has a thickness of 10 to 150 microns when first coated and 2 to 20 microns when dried.

The flattened domains of liquid crystal material can be defined as having a major axis and a minor axis. In a preferred embodiment of a display or display sheet, the major axis is larger in size than the cell (or imaging layer) thickness for a majority of the domains. Such a dimensional relationship is shown in U.S. Pat. No. 6,061,107, hereby incorporated by reference in its entirety.

In a typical matrix address light emitting display device, numerous light emitting devices are formed on a single substrate and arranged in groups in a regular grid pattern. Activation may be by rows and columns, or in an active matrix with individual cathode and anode paths. A metallic electrode can be formed over the electrode layers. For example, in U.S. Pat. No. 5,703,436 to Forrest et al., incorporated herein by reference, transparent indium tin oxide (ITO) is used as the hole injecting electrode, and a Mg—Ag—ITO electrode layer is used for electron injection.

Modern chiral nematic liquid crystal materials usually include at least one nematic host combined with a chiral dopant. In general, the nematic liquid crystal phase is composed of one or more mesogenic components combined to provide useful composite properties. Many such materials are available commercially. The nematic component of the chiral nematic liquid crystal mixture may be comprised of any suitable nematic liquid crystal mixture or composition having appropriate liquid crystal characteristics. Nematic liquid crystals suitable for use in the present invention are preferably composed of compounds of low molecular weight selected from nematic or nematogenic substances, for example from the known classes of the azoxybenzenes, benzylideneanilines, biphenyls, terphenyls, phenyl or cyclohexyl benzoates, phenyl or cyclohexyl esters of cyclohexanecarboxylic acid; phenyl or cyclohexyl esters of cyclohexylbenzoic acid; phenyl or cyclohexyl esters of cyclohexylcyclohexanecarboxylic acid; cyclohexylphenyl esters of benzoic acid, of cyclohexanecarboxyiic acid and of cyclohexylcyclohexanecarboxylic acid; phenyl cyclohexanes; cyclohexylbiphenyls; phenyl cyclohexylcyclohexanes; cyclohexylcyclohexanes; cyclohexylcyclohexenes; cyclohexylcyclohexylcyclohexenes; 1,4-bis-cyclohexylbenzenes; 4,4-bis-cyclohexylbiphenyls; phenyl- or cyclohexylpyrimidines; phenyl- or cyclohexylpyridines; phenyl- or cyclohexylpyridazines; phenyl- or cyclohexyldioxanes; phenyl- or cyclohexyl-1,3-dithianes; 1,2-diphenylethanes; 1,2-dicyclohexylethanes; 1-phenyl-2-cyclohexylethanes; 1-cyclohexyl-2-(4-phenylcyclohexyl)ethanes; 1-cyclohexyl-2',2-biphenylethanes; 1-phenyl-2-cyclohexylphenylethanes; optionally halogenated stilbenes; benzyl phenyl ethers; tolanes; substituted cinnamic acids and esters; and further classes of nematic or nematogenic substances. The 1,4-phenylene groups in these compounds may also be laterally mono- or difluorinated. The liquid crystalline material of this preferred embodiment is based on the achiral compounds of this type. The most important compounds, that are possible as components of these liquid crystalline materials, can be characterized by the following formula R'—X—Y—Z—R" wherein X and Z, which may be identical or different, are in each case, independently from one another, a bivalent radical from the group formed by -Phe-, -Cyc-, -Phe-Phe-, -Phe-Cyc-, -Cyc-Cyc-, -Pyr-, -Dio-, -B-Phe- and -B-Cyc-; wherein Phe is unsubstituted or fluorine substituted 1,4-phenylene, Cyc is trans-1,4-cyclohexylene or 1,4-cyclohexenylene, Pyr is pyrimidine-2,5-diyl or pyridine-2,5-diyl, Dio is 1,3-dioxane-2,5-diyl, and B is 2-(trans-1,4-cyclohexyl) ethyl, pyrimidine-2,5-diyl, pyridine-2,5-diyl or 1,3-dioxane-2,5-diyl. Y in these compounds is selected from the following bivalent groups —CH═CH—, —C≡C—, —N═N(O)—, —CH═CY'—, —CH═N(O)—, —CH2-CH2-, —CO—O—, —CH2-O—, —CO—S—, —CH2-S—, —COO-Phe-COO— or a single bond, with Y' being halogen, preferably chlorine, or —CN; R' and R" are, in each case, independently of one another, alkyl, alkenyl, alkoxy, alkenyloxy, alkanoyloxy, alkoxycarbonyl or alkoxycarbonyloxy with 1 to 18, preferably 1 to 12 C atoms, or alternatively one of R' and R" is —F, —CF3, —OCF3, —Cl, —NCS or —CN. In most of these compounds R' and R' are, in each case, independently of each another, alkyl, alkenyl or alkoxy with different chain length, wherein the sum of C atoms in nematic media generally is between 2 and 9, preferably between 2 and 7. The nematic liquid crystal phases typically consist of 2 to 20, preferably 2 to 15 components. The above list of materials is not intended to be exhaustive or limiting. The lists disclose a variety of representative materials suitable for use or mixtures, which comprise the active element in electro-optic liquid crystal compositions.

Suitable chiral nematic liquid crystal compositions preferably have a positive dielectric anisotropy and include chiral material in an amount effective to form focal conic and twisted planar textures. Chiral nematic liquid crystal materials are preferred because of their excellent reflective characteristics, bistability and gray scale memory. The chiral nematic liquid crystal is typically a mixture of nematic liquid crystal and chiral material in an amount sufficient to produce the desired pitch length. Suitable commercial nematic liquid crystals include, for example, E7, E44, E48, E31, E80, BL087, BL101, ZLI-3308, ZLI-3273, ZLI-5048-000, ZLI-5049-100, ZLI-5100-100, ZLI-5800-000, MLC-6041-100.TL202, TL203, TL204 and TL205 manufactured by E. Merck (Darmstadt, Germany). Although nematic liquid crystals having positive dielectric anisotropy, and especially cyanobiphenyls, are preferred, virtually any nematic liquid crystal known in the art, including those having negative dielectric anisotropy should be suitable for use in the invention. Other nematic materials may also be suitable for use in the present invention as would be appreciated by those skilled in the art.

The chiral dopant added to the nematic mixture to induce the helical twisting of the mesophase, thereby allowing reflection of visible light, can be of any useful structural class. The choice of dopant depends upon several characteristics including among others its chemical compatibility with the nematic host, helical twisting power, temperature sensitivity, and light fastness. Many chiral dopant classes are known in the art: e.g., G. Gottarelli and G. Spada, *Mol. Cryst. Liq. Crys.*, 123, 377 (1985); G. Spada and G. Proni, *Enantiomer*, 3, 301 (1998) and references therein. Typical well known dopant classes include 1,1-binaphthol derivatives; isosorbide (D-1) and similar isomannide esters as disclosed in U.S. Pat. No. 6,217,792; TADDOL derivatives (D-2) as disclosed in U.S. Pat. No. 6,099,751; and the pending spiroindanes esters (D-3) as disclosed in U.S. patent application Ser. No. 10/651,692 titled "Chiral Compounds And Compositions Containing The Same," hereby incorporated by reference.

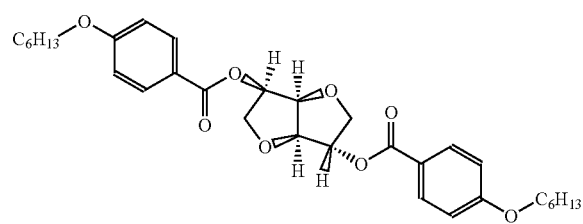

D-1

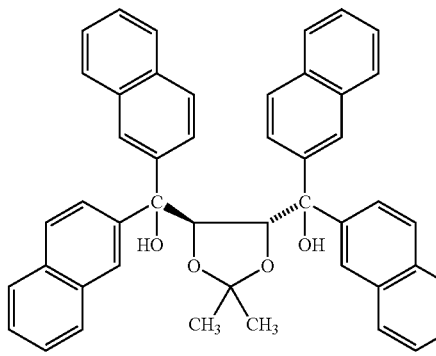

D-2

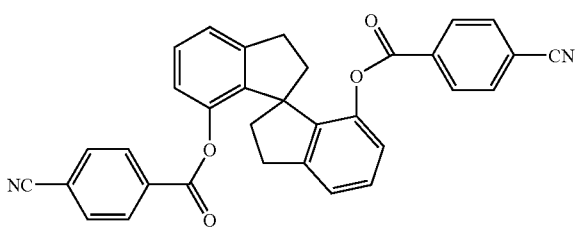

D-3

The pitch length of the liquid crystal materials may be adjusted based upon the following equation (1):

$$\lambda_{max} = n_{av} p_0$$

where $\lambda_{max}$ is the peak reflection wavelength, that is, the wavelength at which reflectance is a maximum, $n_{av}$ is the average index of refraction of the liquid crystal material, and $p_0$ is the natural pitch length of the chiral nematic helix. Definitions of chiral nematic helix and pitch length and methods of its measurement, are known to those skilled in the art such as can be found in the book, Blinov, L. M., Electro-optical and Magneto-Optical Properties of Liquid Crystals, John Wiley & Sons Ltd. 1983. The pitch length is modified by adjusting the concentration of the chiral material in the liquid crystal material. For most concentrations of chiral dopants, the pitch length induced by the dopant is inversely proportional to the concentration of the dopant. The proportionality constant is given by the following equation (2):

$$p_0 = 1/(HTP \cdot c)$$

where c is the concentration of the chiral dopant and HTP is the proportionality constant.

For some applications, it is desired to have LC mixtures that exhibit a strong helical twist and thereby a short pitch length. For example in liquid crystalline mixtures that are used in selectively reflecting chiral nematic displays, the pitch has to be selected such that the maximum of the wavelength reflected by the chiral nematic helix is in the range of visible light. Other possible applications are polymer films with a chiral liquid crystalline phase for optical elements, such as chiral nematic broadband polarizers, filter arrays, or chiral liquid crystalline retardation films. Among these are active and passive optical elements or color filters and liquid crystal displays, for example STN, TN, AMD-TN, temperature compensation, polymer free or polymer stabilized chiral nematic texture (PFCT, PSCT) displays. Possible display industry applications include ultralight, flexible, and inexpensive displays for notebook and desktop computers, instrument panels, video game machines, videophones, mobile phones, hand held PCs, PDAs, e-books, camcorders, satellite navigation systems, store and supermarket pricing systems, highway signs, informational displays, smart cards, toys, and other electronic devices.

Chiral nematic liquid crystal materials and cells, as well as polymer stabilized chiral nematic liquid crystals and cells, are well known in the art and described in, for example, U.S. application Ser. No. 07/969,093 and Ser. No. 08/057,662; Yang et al., Appl. Phys. Lett. 60(25) pp 3102–04 (1992); Yang et al., J. Appl. Phys. 76(2) pp 1331 (1994); published International Patent Application No. PCT/US92/09367; and published International Patent Application No. PCT/US92/03504, all of which are incorporated herein by reference.

Carriers

In a preferred embodiment, a light modulating layer is deposited over a first conductor. The light modulating layer contains a chiral nematic liquid crystal. The selected material preferably exhibits high optical and electrical anisotropy and matches the index of refraction of the carrier polymer, when the material is electrically oriented. Examples of such materials are E. Merck's BL-03, BL-048 or BL-033, which are available from EM Industries of Hawthorne, N.Y. Other light reflecting or diffusing modulating, electrically operated materials can also be coated, such as a micro-encapsulated electrophoretic material in oil.

The liquid crystal can be a chiral doped nematic liquid crystal, also known as cholesteric liquid crystal, such as those disclosed in U.S. Pat. No. 5,695,682. Application of fields of various intensity and duration change the state of chiral doped nematic materials from a reflective to a transmissive state. These materials have the advantage of maintaining a given state indefinitely after the field is removed. Cholesteric liquid crystal materials can be Merck BL112, BL118 or BL126 that are available from EM Industries of Hawthorne, N.Y. The light modulating layer is effective in two conditions.

The liquid crystalline layer or layers may also contain other ingredients. For example, while color is introduced by the liquid crystal material itself, pleochroic dyes may be added to intensify or vary the color reflected by the cell. Similarly, additives such as fumed silica may be dissolved in the liquid crystal mixture to adjust the stability of the various chiral nematic textures. A dye in an amount ranging from about 0.25% to about 1.5% may also be used.

The liquid crystalline droplets or domains may be formed by any method, known to those of skill in the art, such as by forming micellers using long chain surfactants or phase separation techniques. In a preferred embodiment, a method referred to as "limited coalescence" is used to form uniformly sized emulsions of liquid crystalline material, as disclosed in U.S. Pat. Nos. 6,556,262 and 6,423,368, incorporated herein by reference. Limited coalescence is defined as dispersing a light modulating material below a given size, and using coalescent limiting material to limit the size of the resulting domains. Such materials are characterized as having a ratio of maximum to minimum domain size of less than 2:1. By use of the term "uniform domains", it is meant that domains are formed having a domain size variation of less than 2:1. Limited domain materials have improved optical properties. For example, the liquid crystal material can be homogenized in the presence of finely divided silica, a coalescence limiting material, such as LUDOX® from DuPont Corporation. A promoter material can be added to the aqueous bath to drive the colloidal particles to the liquid-liquid interface. In a preferred embodiment, a copolymer of adipic acid and 2-(methylamino)ethanol can be used as the promoting agent in the water bath. The liquid crystal material can be dispersed using ultrasound to create liquid crystal domains below 1 micron in size. When the ultrasound energy is removed, the liquid crystal material coalesces into domains of uniform size. These emulsions can be diluted into gelatin solution for subsequent coating. The limited coalescent materials can be coated using a photographic emulsion coating machine onto sheets of polyester having an ITO coating with a sheet conductivity of 300 ohms per square. The coating can be dried to provide a 9 micron thick polymerically dispersed cholesteric coating. By using limited coalescence, there are few, if any, parasitic smaller domains (having undesirable electro-optical properties) within the dried coatings.

Suitable hydrophilic or water soluble binders include both naturally occurring substances such as proteins, protein derivatives, cellulose derivatives (e.g. cellulose esters), gelatins and gelatin derivatives, polysaccaharides, casein, and the like, and synthetic water permeable colloids such as poly(vinyl lactams), acrylamide polymers, poly(vinyl alcohol) and its derivatives, hydrolyzed polyvinyl acetates, polymers of alkyl and sulfoalkyl acrylates and methacrylates, polyamides, polyvinyl pyridine, acrylic acid polymers, maleic anhydride copolymers, polyalkylene oxide, methacrylamide copolymers, polyvinyl oxazolidinones, maleic acid copolymers, vinyl amine copolymers, methacrylic acid copolymers, acryloyloxyalkyl acrylate and methacrylates, vinyl imidazole copolymers, vinyl sulfide copolymers, and homopolymer or copolymers containing styrene sulfonic acid. Gelatin is preferred.

The emulsion can be dueled with an aqueous hardener solution to create a material resistant to humidity and temperature variations when used the display. The addition of a bacteriostat prevents gelatin degradation during emulsion storage and during material operation. The gelatin concentration in the emulsion when coated is preferably between about 2 and 20 weight percent based on the weight of the emulsion. In the final emulsion, the liquid crystal material may be dispersed at 8% concentration in a 5% gelatin aqueous solution.

Although hardened gelatin is used in photographs to harden the material, the need is not the same in liquid crystal displays in which the gelatin is typically protected by several layers of material including a plastic or glass substrate. Typically, liquid crystal material is wicked between plates of glass. Furthermore, unless necessary, a gelatin hardener can be problematic for coating a gelatin material and may require more difficult manufacture. However, gelatin, containing hardener, may optionally be used in the present invention. In the context of this invention, hardeners are defined as any additive, which causes chemical crosslinking in gelatin or gelatin derivatives.

Many conventional hardeners are known to crosslink gelatin. Gelatin crosslinking agents (i.e., the hardener) are included in an amount of at least about 0.01 wt. % and preferably from about 0.1 to about 10 wt. % based on the weight of the solid dried gelatin material used (by dried gelatin is meant substantially dry gelatin at ambient conditions as for example obtained from Eastman Gel Co., as compared to swollen gelatin), and more preferably in the amount of from about 1 to about 5 percent by weight. More than one gelatin crosslinking agent can be used if desired. Suitable hardeners may include inorganic, organic hardeners, such as aldehyde hardeners and olefinic hardeners. Inorganic hardeners include compounds such as aluminum salts, especially the sulfate, potassium and ammonium alums, ammonium zirconium carbonate, chromium salts such as chromium sulfate and chromium alum, and salts of titanium dioxide, and zirconium dioxide. Representative organic hardeners or gelatin crosslinking agents may include aldehyde and related compounds, pyridiniums, olefins, carbodiimides, and epoxides. Thus, suitable aldehyde hardeners include formaldehyde and compounds that contain two or more aldehyde functional groups such as glyoxal, gluteraldehyde and the like. Other preferred hardeners include compounds that contain blocked aldehyde functional groups such as aldehydes of the type tetrahydro-4-hydroxy-5-methyl-2(1H)-pyrimidinone polymers (Sequa SUNREZ® 700), polymers of the type having a glyoxal polyol reaction product consisting of 1 anhydroglucose unit: 2 glyoxal units (SEQUAREZ® 755 obtained from Sequa Chemicals, Inc.), DME-Melamine non-formaldehyde resins such as Sequa CPD3046–76 obtained from Sequa Chemicals Inc., and 2,3-dihydroxy-1,4-dioxane (DHD). Thus, hardeners that contain active olefinic functional groups include, for example, bis-(vinylsulfonyl)-methane (BVSM), bis-(vinylsulfonyl-methyl)ether (BVSME), 1,3,5-triacryloylhexahydro-s-triazine, and the like. In the context of the present invention, active olefinic compounds are defined as compounds having two or more olefinic bonds, especially unsubstituted vinyl groups, activated by adjacent electron withdrawing groups (The Theory of the Photographic Process, 4th Edition, T. H. James, 1977, Macmillan Publishing Co., page 82). Other examples of hardening agents can be found in standard references such as The Theory of the Photographic Process, T. H. James, Macmillan Publishing Co., Inc. (New York 1977) or in Research Disclosure, September 1996, Vol. 389, Part IIB (Hardeners) or in Research Disclosure, September 1994, Vol. 365, Item 36544, Part IIB (Hardeners). Research Disclosure is published by Kenneth Mason Publications, Ltd., Dudley House, 12 North St., Emsworth, Hampshire P010 7DQ, England. Olefinic hardeners are most preferred, as disclosed in U.S. Pat. Nos. 3,689,274, 2,994,611, 3,642,486, 3,490,911, 3,635,718, 3,640,720, 2,992,109, 3,232,763, and 3,360,372.

Among hardeners of the active olefin type, a preferred class of hardeners particularly are compounds comprising two or more vinyl sulfonyl groups. These compounds are hereinafter referred to as "vinyl sulfones." Compounds of this type are described in numerous patents including, for example, U.S. Pat. Nos. 3,490,911, 3,642,486, 3,841,872 and 4,171,976. Vinyl sulfone hardeners are believed to be effective as hardeners as a result of their ability to crosslink polymers making up the colloid.

The flexible plastic substrate can be any flexible self supporting plastic film that supports the thin conductive metallic film. "Plastic" means a high polymer, usually made from polymeric synthetic resins, which may be combined with other ingredients, such as curatives, fillers, reinforcing agents, colorants, and plasticizers. Plastic includes thermoplastic materials and thermosetting materials.

The flexible plastic film must have sufficient thickness and mechanical integrity so as to be self supporting, yet should not be so thick as to be rigid. Typically, the flexible plastic substrate is the thickest layer of the composite film in thickness. Consequently, the substrate determines to a large extent the mechanical and thermal stability of the fully structured composite film.

Another significant characteristic of the flexible plastic substrate material is its glass transition temperature (Tg). Tg is defined as the glass transition temperature at which plastic material will change from the glassy state to the rubbery state. It may comprise a range before the material may actually flow. Suitable materials for the flexible plastic substrate include thermoplastics of a relatively low glass transition temperature, for example up to 150° C., as well as materials of a higher glass transition temperature, for example, above 150° C. The choice of material for the flexible plastic substrate would depend on factors such as manufacturing process conditions, such as deposition temperature, and annealing temperature, as well as post-manufacturing conditions such as in a process line of a displays manufacturer. Certain of the plastic substrates discussed below can withstand higher processing temperatures of up to at least about 200° C., some up to 3000–350° C., without damage.

Typically, the flexible plastic substrate is polyethylene terephthalate (PET), polyethylene naphthalate (PEN), polyethersulfone (PES), polycarbonate (PC), polysulfone, a phenolic resin, an epoxy resin, polyester, polyimide, polyamide, polyetherester, polyetheramide, acetates including cellulose acetate, aliphatic polyurethanes, polyacrylonitrile, polytetrafluoroethylenes, polyvinylidene fluorides, poly(methyl(x-methacrylates), an aliphatic or cyclic polyolefin, polyarylate (PAR), polyetherimide (PEI), polyethersulphone (PES), polyimide (PI), Teflon poly(perfluoro-alboxy) fluoropolymer (PFA), poly(ether ether ketone) (PEEK), poly(ether ketone) (PEK), poly(ethylene tetrafluoroethylene)fluoropolymer (PETFE), and poly(methyl methacrylate) and various acrylate/methacrylate copolymers (PMMA). Aliphatic polyolefins may include high density polyethylene (HDPE), low density polyethylene (LDPE), and polypropylene, including oriented polypropylene (OPP). Cyclic polyolefins may include poly(bis(cyclopentadiene)). A preferred flexible plastic substrate is a cyclic polyolefin or a polyester. Various cyclic polyolefins are suitable for the flexible plastic substrate. Examples include Arton® made by Japan Synthetic Rubber Co., Tokyo, Japan; Zeanor T made by Zeon Chemicals L.P., Tokyo Japan; and Topas® made by Celanese A. G., Kronberg Germany. Arton is a poly(bis (cyclopentadiene)) condensate that is a film of a polymer. Alternatively, the flexible plastic substrate can be a polyester. A preferred polyester is an aromatic polyester such as Arylite. Although various examples of plastic substrates are set forth above, it should be appreciated that the substrate can also be formed from other materials such as glass and quartz.

The flexible plastic substrate can be reinforced with a hard coating. Typically, the hard coating is an acrylic coating. Such a hard coating typically has a thickness of from 1 to 15 microns, preferably from 2 to 4 microns and can be provided by free radical polymerization, initiated either thermally or by ultraviolet radiation, of an appropriate polymerizable material. Depending on the substrate, different hard coatings can be used. When the substrate is polyester or Arton, a particularly preferred hard coating is the coating known as "Lintec". Lintec contains UV cured polyester acrylate and colloidal silica. When deposited on Arton, it has a surface composition of 35 atom % C, 45 atom % 0, and 20 atom % Si, excluding hydrogen. Another particularly preferred hard coating is the acrylic coating sold under the trademark "Terrapin" by Tekra Corporation, New Berlin, Wis.

In one embodiment, a sheet supports a conventional polymer dispersed light modulating material. The sheet includes a substrate. The substrate may be made of a polymeric material, such as Kodak Estar film base formed of polyester plastic, and have a thickness of between 20 and 200 microns. For example, the substrate may be an 80 micron thick sheet of transparent polyester. Other polymers, such as transparent polycarbonate, can also be used. Alternatively, the substrate 15 may be thin, transparent glass.

The support may be either opaque or transparent. In one preferred embodiment, the supports preferably comprise opaque and/or transparent film-based output and capture supports. Opaque supports include plain paper, coated paper, resin-coated paper such as polyolefin-coated paper, synthetic paper, photographic paper support, melt-extrusion-coated paper, polyolefin-laminated paper, such as biaxially oriented support laminates, web materials, and sheet materials. In a preferred embodiment, the support comprises a support for an imaging element, which has an opacity of greater than 60. The support may also consist of microporous materials such as polyethylene polymer-containing material sold by PPG Industries, Inc., Pittsburgh, Pa. under the trade name of Teslin®, Tyvek® synthetic paper (DuPont Corp.), impregnated paper such as Duraform®, and OPPalyte® films (Mobil Chemical Co.) and other composite films listed in U.S. Pat. No. 5,244,861. Commercially available oriented and unoriented polymer films, such as opaque biaxially oriented polypropylene or polyester, may also be utilized. Such supports may contain pigments, air voids or foam voids to enhance their opacity. The term as used herein, "transparent" means the ability to pass visible radiation without significant deviation or absorption. In a preferred embodiment, the element has a % transmission of greater than 80%.

The imaging element support used in the invention may have a thickness of from 50 to 500 mm, preferably from 75 to 350 mm. Antioxidants, brightening agents, antistatic or conductive agents, plasticizers and other known additives may be incorporated into the support, if desired. In one preferred embodiment, the element has an L* of greater than 80 and a b* of from 0 to −6.0.

In one preferred embodiment, the support may comprise a paper core that has adhered thereto at least one flange layer. The paper may come from a broad range of papers, from high end papers, such as photographic paper to low end papers, such as newsprint. In a preferred embodiment, photographic paper is employed. The paper may be made on a standard continuous fourdrinier wire machine or on other modern paper formers. Any pulps known in the art to provide paper may be used in this invention. Bleached hardwood chemical kraft pulp is preferred, as it provides brightness, a smooth starting surface, and good formation while maintaining strength. Paper cores useful to this invention are of caliper from 50 mm to 230 mm, preferably from 100 mm to 190 mm because then the overall element thickness is in the range preferred by customers for imaging element and processes in existing equipment. They may be "smooth" as to not interfere with the viewing of images. Chemical additives to impart hydrophobicity (sizing), wet strength, and dry strength may be used as needed. Inorganic filler materials such as $TiO_2$, talc, mica, $BaSO_4$ and $CaCO_3$ clays may be used to enhance optical properties and reduce cost as needed. Dyes, biocides, and processing chemicals may also be used as needed. The paper may also be subject to smoothing operations such as dry or wet calendering, as well as to coating through an in-line or an off-line paper coater.

In another embodiment, the support comprises a synthetic paper, preferably cellulose free, having a polymer core that has adhered thereto at least one flange layer. The polymer core comprises a homopolymer such as a polyolefin, polystyrene, polyester, polyvinylchloride or other typical thermoplastic polymers; their copolymers or their blends thereof; or other polymeric systems like polyurethanes, polyisocyanurates. These materials may or may not have been expanded either through stretching resulting in voids or through the use of a blowing agent to consist of two phases, a solid polymer matrix, and a gaseous phase. Other solid phases may be present in the form of fillers that are of organic (polymeric, fibrous) or inorganic (glass, ceramic, metal) origin. The fillers may be used for physical, optical (lightness, whiteness, and opacity), chemical, or processing property enhancements of the core. Microvoided composite biaxially oriented sheets may be utilized and are conveniently manufactured by coextrusion of the core and surface layers, followed by biaxial orientation, whereby voids are formed around void-initiating material contained in the core layer. Such composite sheets are disclosed in, for example, U.S. Pat. Nos. 4,377,616; 4,758,462 and 4,632,869, the disclosure of which is incorporated for reference.

"Void" is used herein to mean devoid of added solid and liquid matter, although it is likely the "voids" contain gas. The void-initiating particles, which remain in the finished packaging sheet core, should be from 0.1 to 10 microns in diameter and preferably round in shape to produce voids of the desired shape and size. The size of the void is also dependent on the degree of orientation in the machine and transverse directions. Ideally, the void would assume a shape that is defined by two opposed, and edge contacting, concave disks. In other words, the voids tend to have a lens-like or biconvex shape. The voids are oriented so that the two major dimensions are aligned with the machine and transverse directions of the sheet. The Z-direction axis is a minor dimension and is roughly the size of the cross diameter of the voiding particle. The voids generally tend to be closed cells, and thus there is virtually no path open from one side of the voided core to the other side through which gas or liquid may traverse.

In another embodiment, the support comprises a synthetic paper, preferably cellulose free, having a foamed polymer core or a foamed polymer core that has adhered thereto at least one flange layer. The polymers described for use in a polymer core may also be employed in manufacture of the foamed polymer core layer, carried out through several mechanical, chemical, or physical means. Mechanical methods include whipping a gas into a polymer melt, solution, or suspension, which then hardens either by catalytic action or heat or both, thus entrapping the gas bubbles in the matrix. Chemical methods include such techniques as the thermal decomposition of chemical blowing agents generating gases such as nitrogen or carbon dioxide by the application of heat or through exothermic heat of reaction during polymerization. Physical methods include such techniques as the expansion of a gas dissolved in a polymer mass upon reduction of system pressure; the volatilization of low boiling liquids such as fluorocarbons or methylene chloride, or the incorporation of hollow microspheres in a polymer matrix. The choice of foaming technique is dictated by desired foam density reduction, desired properties, and manufacturing process. Preferably, the foamed polymer core comprises a polymer expanded through the use of a blowing agent.

In a preferred embodiment, polyolefins such as polyethylene and polypropylene, their blends and their copolymers are used as the matrix polymer in the foamed polymer core along with a chemical blowing agent such as sodium bicarbonate and its mixture with citric acid, organic acid salts, azodicarbonamide, azobisformamide, azobisisobutyrolnitrile, diazoaminobenzene, 4,4'-oxybis(benzene sulfonyl hydrazide) (OBSH), N,N'-dinitrosopentamethyltetramine (DNPA), sodium borohydride, and other blowing agent agents well known in the art. The preferred chemical blowing agents would be sodium bicarbonate/citric acid mixtures, azodicarbonamide; though others may also be used. These foaming agents may be used together with an auxiliary foaming agent, nucleating agent, and a crosslinking agent.

The flange layers, which may be applied to the core of the support, may be chosen to satisfy specific requirements of flexural modulus, caliper, surface roughness, and optical properties such as colorimetry and opacity. The flange members may be formed integral with the core by manufacturing the core with a flange skin sheet or the flange may be laminated to the core material. The integral extrusion of flange members with the core is preferred for cost. The lamination technique allows a wider range of properties and materials to be used for the skin materials.

The flange sheets used comprise thermoplastic polymers. Suitable classes of thermoplastic polymers for blending include polyolefins, polyesters, polyamides, polycarbonates, cellulosic esters, polystyrene, polyvinyl resins, polysulfonamides, polyethers, polyimides, polyvinylidene fluoride, polyurethanes, polyphenylenesulfides, polytetrafluoroethylene, polyacetals, polysulfonates, polyester ionomers, and polyolefin ionomers. Copolymers and/or mixtures of these polymers may be used. Polypropylene and polyethylene are preferred, as they are low in cost and have desirable strength properties.

Suitable polyolefins include polypropylene, polyethylene, polymethylpentene, and mixtures thereof. Polyolefin copolymers, including copolymers of propylene and ethylene such as hexene, butene and octene are also useful. Polypropylenes are preferred because they are low in cost and have good strength and surface properties.

Suitable polyesters include those produced from aromatic, aliphatic or cycloaliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedicarboxylic, sodiosulfoisophthalic and mixtures thereof. Examples of suitable glycols include ethylene glycol, propylene glycol, butanediol, pentanediol, hexanediol, 1,4-cyclohexanedimethanol, diethylene glycol, other polyethylene glycols and mixtures thereof. Such polyesters are well known in the art and may be produced by known techniques, for example, those described in U.S. Pat. Nos. 2,465,319 and 2,901,466. Preferred continuous matrix polyesters are those having repeat units from terephthalic acid or naphthalene dicarboxylic acid and at least one glycol selected from ethylene glycol, 1,4-butanediol and 1,4-cyclohexanedimethanol. Poly(ethylene terephthalate), which may be modified by small amounts of other monomers, is especially preferred. Other suitable polyesters include liquid crystal copolyesters formed by the inclusion of suitable amount of a co-acid component such as stilbene dicarboxylic acid. Examples of such liquid crystal copolyesters are those disclosed in U.S. Pat. Nos. 4,420,607, 4,459,402 and 4,468, 510.

Useful polyamides include nylon 6, nylon 66, and mixtures thereof. Copolymers of polyamides are also suitable continuous phase polymers. An example of a useful polycarbonate is bisphenol-A polycarbonate. Cellulosic esters suitable for use as the continuous phase polymer of the composite sheets include cellulose nitrate, cellulose triacetate, cellulose diacetate, cellulose acetate propionate, cellulose acetate butyrate, and mixtures or copolymers thereof. Useful polyvinyl resins include polyvinyl chloride, poly (vinyl acetal), and mixtures thereof. Copolymers of vinyl resins may also be utilized.

The flange layers may also include other additives. These may include filler materials such as titanium dioxide and calcium carbonate and colorants, pigments, dyes and/or optical brighteners or other additives known to those skilled in the art. Some of the commonly used inorganic filler materials are talc, clays, calcium carbonate, magnesium carbonate, barium sulfate, mica, aluminum hydroxide (trihydrate), wollastonite, glass fibers and spheres, silica, various silicates, and carbon black. Some of the organic fillers used are wood flour, jute fibers, sisal fibers, or polyester fibers. The preferred fillers are talc, mica, and calcium carbonate because they provide excellent modulus enhancing properties. The fillers may be in the flange or an overcoat layer, such as polyethylene. Generally, base materials for color print imaging materials are white, possibly with a blue tint as a slight blue is preferred to form a preferred white look to whites in an image. Any suitable white pigment may be incorporated in the support such as, for example, titanium dioxide, zinc oxide, zinc sulfide, zirconium dioxide, white lead, lead sulfate, lead chloride, lead aluminate, lead phthalate, antimony trioxide, white bismuth, tin oxide, white manganese, white tungsten, and combinations thereof. The preferred pigment is titanium dioxide. In addition, suitable optical brightener may be employed in the polyolefin layer including those described in Research Disclosure, Vol. No. 308, December 1989, Publication 308119, Paragraph V, page 998.

In addition, it may be desirable to use various additives such as antioxidants, stiffness enhancing agents, slip agents, or lubricants, and light stabilizers in the synthetic elements, especially synthetic plastic elements, as well as biocides in the paper elements. These additives are added to improve, among other things, the dispersibility of fillers and/or colorants, as well as the thermal and color stability during processing and the manufacturability and the longevity of the finished article. For example, polyolefin coatings may contain antioxidants such as 4,4'-butylidene-bis(6-tert-butyl-meta-cresol), di-lauryl-3,3'-thiopropionate, N-butylated-p-aminophenol, 2,6-di-tert-butyl-p-cresol, 2,2-di-tert-butyl-4-methyl-phenol, N,N-disalicylidene-1,2-diaminopropane, tetra(2,4-tert-butylphenyl)-4,4'-diphenyl diphosphonite, octadecyl 3-(3',5'-di-tert-butyl-4'-hydroxyphenyl propionate), combinations of the above, lubricants, such as higher aliphatic acid metal salts such as magnesium stearate, calcium stearate, zinc stearate, aluminum stearate, calcium palmitate, zirconium octylate, sodium laurate, and salts of benzoic acid such as sodium benzoate, calcium benzoate, magnesium benzoate and zinc benzoate; light stabilizers such as hindered amine light stabilizers (HALS), of which a preferred example is poly{[6-[(1,1,3,3-tetramethylbutylamino}-1,3,5-triazine-4-piperidinyl)-imino]-1,6-hexanediyl[{2,2,6,6-tetramethyl-4-piperdinyl)imino]} (Chimassorb® 944 LD/FL), 7-Oxa-3,20-diazadispiro[5.1.11.2] heneicosan-21-one, 2,2,4,4-tetramethyl-20-(oxiranylmethyl)-, homopolymer (HostavinO N30).

The flange layers, which may be applied to the foam core, may be unoriented or may have been stretched and oriented. They may be filled with suitable filler materials to further increase the modulus of the polymer and enhance other properties such as opacity and smoothness.

In one preferred embodiment, the flange layer may be a biaxially oriented sheet. The thickness of the biaxially oriented sheet should be from 5 to 150 microns. Below 5 microns, the sheets may not be thick enough to minimize any inherent non-planarity in the support and would be more difficult to manufacture. At thicknesses higher than 150 microns, little improvement in either surface smoothness or mechanical properties is seen, and so there is little justification for the further increase in cost for extra materials.

The biaxially oriented flange layers may be transparent for viewing objects through the back sheet or addenda, also referred to herein as additives, may be added to the biaxially oriented flange layers to color and opacify these layers.

The support may be produced by any method know in the art for producing imaging supports. A preferred embodiment is extrusion of the antistatic layer on to the core layer (paper or synthetic core, for example). This may entail either monolayer extrusion or coextrusion of additional layers. Extrusion laminating may be carried out by bringing together the polymeric flange sheets and the core with application of an adhesive between them.

In one embodiment utilizing oriented sheets, most preferably biaxially oriented sheets, the coextrusion, quenching, orienting, and heat setting of these biaxially oriented sheets may be effected by any process which is known in the art for producing oriented sheet, such as by a flat sheet process or a bubble or tubular process, as in, for example, U.S. Pat. No. 4,764,425. The flat sheet process involves extruding or coextruding the blend through a slit die and rapidly quenching the extruded or coextruded support upon a chilled casting drum so that the polymer component(s) of the sheet are quenched below their solidification temperature. The quenched sheet is then biaxially oriented by stretching in mutually perpendicular directions at a temperature above the glass transition temperature of the polymer(s). The sheet may be stretched in one direction and then in a second direction or may be simultaneously stretched in both directions. After the sheet has been stretched, it is heat set by heating to a temperature sufficient to crystallize the polymers while restraining to some degree the sheet against retraction in both directions of stretching.

To promote adhesion, an adhesive may be applied to either the flange sheets or the core prior to their being brought into a nip. In a preferred form, the adhesive is applied into the nip simultaneously with the flange sheets and the core. The adhesive may be any suitable material that does not have a harmful effect upon the element. The preferred materials are melt extrudable polymers but other solution based adhesives may also be used. These may include both aqueous and solvent based adhesive and may be either pressure sensitive or thermal activated adhesives. Adhesive composition may be selected from the group consisting of natural rubber, synthetic rubber, acrylics, acrylic copolymers, vinyl polymers, vinyl acetate-, urethane, acrylate-type materials, copolymer mixtures of vinyl chloride-vinyl acetate, polyvinylidene, vinyl acetate-acrylic acid copolymers, stryene butadiene, carboxylated styrene butadiene copolymers, ethylene copolymers, polyvinyl alcohol, polyesters and copolymers, cellulosic and modified cellulosic, starch and modified starches compounds, epoxies, polyisocyanate, polyimides. A preferred adhesive material is a 20%/80% blend of an extrusion grade low density polyethylene melt extruded at 12 g/m2 and an acrylate modified copolymer (Dupont Bynel) and that helps promote adhesion of polyester compounds to other materials such as paper. A blend with polyethylene also helps to improve adhesion to polyethylene.

In a preferred embodiment, the layer of adhesive resin may also comprise an ethylene polymer blended with a metallocene catalyzed polyolefin plastomer, ionomer, ethylene vinyl acetate copolymer, ethylene methyl methacrylate copolymer, ethylene ethyl acrylate copolymer, ethylene methyl acrylate copolymer, ethylene acrylic acid copolymer, ethylene ethyl acrylate maleic anhydride copolymer, or ethylene methacrylic acid copolymer.

Metallocene catalyzed polyolefin plastomers are preferred for bonding-oriented polymer sheets to photographic base paper because they offer a combination of excellent adhesion to smooth biaxially oriented polymer sheets, are easily melt extruded using conventional extrusion equipment and are low in cost when compared to other adhesive resins. Metallocenes are a class of highly active olefin catalysts that are used in the preparation of polyolefin plastomers. These catalysts, particularly those based on group IVB transition metals such as zirconium, titanium, and hafnium, show extremely high activity in ethylene polymerization. Various forms of the catalyst system of the metallocene type may be used for polymerization to prepare the polymers used for bonding biaxially oriented polyolefin sheets to cellulose paper. Forms of the catalyst system include but are not limited to those of homogeneous, supported catalyst type, high pressure process or a slurry or a solution polymerization process. The metallocene catalysts are also highly flexible in that, by manipulation of catalyst composition and reaction conditions, they may be made to provide polyolefins with controllable molecular weights. Suitable polyolefins include polypropylene, polyethylene, polymethylpentene, polystyrene, polybutylene and mixtures thereof. Development of these metallocene catalysts for the polymerization of ethylene is found in U.S. Pat. No. 4,937,299 (Ewen et al.) The most preferred metallocene catalyzed copolymers are very low density polyethylene (VLDPE) copolymers of ethylene and a C4 to C10 alpha monolefin, most preferably copolymers and terpolymers of ethylene and butene-1 and hexene-1. The melt index of the metallocene catalyzed ethylene plastomers preferably fall in a range of from 2.5 g/10 min to 27 g/10 min. The density of the metallocene catalyzed ethylene plastomers preferably falls in a range of from 0.8800 to 0.9100. In one preferred embodiment, low density polyethylene (hereinafter referred to as LDPE) may be utilized with the metallocene catalyzed ethylene plastomer. In general, the preferred range of LDPE blended is 10% to 80% by weight.

Addenda, also referred to herein as additives, may also be added to the adhesive layer. Any known material used in the art to improve the optical performance of the system may be used. The use of TiO2 is preferred. During the lamination process, it is desirable to also maintain control of the tension of the flange sheets in order to minimize curl in the resulting laminated receiver support.

The support, while described as having preferably at least two or three layers—a core and a flange layer on at least one side, may also be provided with additional layers that may serve to change the properties of the support. These might include layers to provide a vapor barrier, to improve opacity, to control color or static, to make them heat sealable, or to improve the adhesion to the support or to the photosensitive layers. Examples of this would be coating polyvinylidene chloride for heat seal properties. Further examples include flame, plasma, or corona discharge treatment to improve printability or adhesion.

Biaxially oriented sheets, while described as having preferably at least one layer, may also be provided with additional layers that may serve to change the properties of the biaxially oriented sheet. Such layers might contain tints, antistatic or conductive materials, or slip agents to produce sheets of unique properties. Biaxially oriented sheets may be formed with surface layers, referred to herein as skin layers, which would provide an improved adhesion, or look to the support and photographic element. The biaxially oriented extrusion may be carried out with as many as 10 layers if desired to achieve some particular desired property. The biaxially oriented sheet may be made with layers of the same polymeric material, or it may be made with layers of different polymeric composition. For compatibility, an auxiliary layer may be used to promote adhesion of multiple layers.

The LCD contains at least one conductive layer, which typically is comprised of a primary metal oxide. This conductive layer may comprise other metal oxides such as indium oxide, titanium dioxide, cadmium oxide, gallium indium oxide, niobium pentoxide and tin dioxide. See, Int. Publ. No. WO 99/36261 by Polaroid Corporation. In addition to the primary oxide such as ITO, the at least one conductive layer can also comprise a secondary metal oxide such as an oxide of cerium, titanium, zirconium, hafnium and/or tantalum. See, U.S. Pat. No. 5,667,853 to Fukuyoshi et al. (Toppan Printing Co.). Other transparent conductive oxides include, but are not limited to $ZnO_2$, $Zn_2SnO_4$, $Cd_2SnO_4$, $Zn_2In_2O_5$, $MgIn_2O_4$, $Ga_2O_3$—$In_2O_3$, or $TaO_3$. The conductive layer may be formed, for example, by a low temperature sputtering technique or by a direct current sputtering technique, such as DC-sputtering or RF-DC sputtering, depending upon the material or materials of the underlying layer. The conductive layer may be a transparent, electrically conductive layer of tin oxide or indium-tin oxide (ITO), or polythiophene, with ITO being the preferred material. Typically, the conductive layer is sputtered onto the substrate to a resistance of less than 250 ohms per square. Alternatively, conductive layer may be an opaque electrical conductor formed of metal such as copper, aluminum or nickel. If the conductive layer is an opaque metal, the metal can be a metal oxide to create a light absorbing conductive layer.

Indium tin oxide (ITO) is the preferred conductive material, as it is a cost effective conductor with good environmental stability, up to 90% transmission, and down to 20 ohms per square resistivity. An exemplary preferred ITO layer has a % T greater than or equal to 80% in the visible region of light, that is, from greater than 400 nm to 700 nm, so that the film will be useful for display applications. In a preferred embodiment, the conductive layer comprises a layer of low temperature ITO which is polycrystalline. The ITO layer is preferably 10–120 nm in thickness, or 50–100 nm thick to achieve a resistivity of 20–60 ohms/square on plastic. An exemplary preferred ITO layer is 60–80 nm thick.

The conductive layer is preferably patterned. In one embodiment, the electrically conductive layer is patterned with actinic radiation. The conductive layer is preferably patterned into a plurality of electrodes. The patterned electrodes may be used to form a LCD device. In another embodiment, two conductive substrates are positioned facing each other and cholesteric liquid crystals are positioned therebetween to form a device. The patterned ITO conductive layer may have a variety of dimensions. Exemplary dimensions may include line widths of 10 microns, distances between lines, that is, electrode widths, of 200 microns, depth of cut, that is, thickness of ITO conductor, of 100 nanometers. ITO thicknesses on the order of 60, 70, and greater than 100 nanometers are also possible. In one embodiment, the electrically conductive layer has a surface conductivity of less than $10^4$ ohms/sq, sufficient to switch the state of the electrically modulated material.

The display may also contain a second conductive layer applied to the surface of the light modulating layer. The second conductive layer desirably has sufficient conductivity to carry a field across the light modulating layer. The second conductive layer may be formed in a vacuum environment using materials such as aluminum, tin, silver, platinum, carbon, tungsten, molybdenum, or indium. Oxides of these metals can be used to darken patternable conductive layers. The metal material can be excited by energy from resistance heating, cathodic arc, electron beam, sputtering or magnetron excitation. The second conductive layer may comprise coatings of tin oxide or indium-tin oxide, resulting in the layer being transparent. Alternatively, second conductive layer may be printed conductive ink.

For higher conductivities, the second conductive layer may comprise a silver based layer which contains silver only or silver containing a different element such as aluminum (Al), copper (Cu), nickel (Ni), cadmium (Cd), gold (Au), zinc (Zn), magnesium (Mg), tin (Sn), indium (In), tantalum (Ta), titanium (Ti), zirconium (Zr), cerium (Ce), silicon (Si), lead (Pb) or palladium (Pd). In a preferred embodiment, the conductive layer comprises at least one of gold, silver and a gold/silver alloy, for example, a layer of silver coated on one or both sides with a thinner layer of gold. See, Int. Publ. No. WO 99/36261 by Polaroid Corporation. In another embodiment, the conductive layer may comprise a layer of silver alloy, for example, a layer of silver coated on one or both sides with a layer of indium cerium oxide (InCeO). See U.S. Pat. No. 5,667,853, incorporated herein in by reference.

The second conductive layer may be patterned irradiating the multilayered conductor/substrate structure with ultraviolet radiation so that portions of the conductive layer are ablated therefrom. It is also known to employ an infrared (IR) fiber laser for patterning a metallic conductive layer overlying a plastic film, directly ablating the conductive layer by scanning a pattern over the conductor/film structure. See: Int. Publ. No. WO 99/36261 and "42.2: A New Conductor Structure for Plastic LCD Applications Utilizing 'All Dry' Digital Laser Patterning," 1998 SID International Symposium Digest of Technical Papers, Anaheim, Calif., May 17–22, 1998, no. VOL. 29, May 17, 1998, pages 1099–1101, both incorporated herein by reference.

The LCD may also comprises at least one "functional layer" between the conductive layer and the substrate. The functional layer may comprise a protective layer or a barrier layer. The protective layer useful in the practice of the invention can be applied in any of a number of well known techniques, such as dip coating, rod coating, blade coating, air knife coating, gravure coating and reverse roll coating, extrusion coating, slide coating, curtain coating, and the like. The liquid crystal particles and the binder are preferably mixed together in a liquid medium to form a coating composition. The liquid medium may be a medium such as water or other aqueous solutions in which the hydrophilic colloid are dispersed with or without the presence of surfactants. A preferred barrier layer may acts as a gas barrier or a moisture barrier and may comprise SiOx, AlOx or ITO. The protective layer, for example, an acrylic hard coat, functions to prevent laser light from penetrating to functional layers between the protective layer and the substrate, thereby protecting both the barrier layer and the substrate. The functional layer may also serve as an adhesion promoter of the conductive layer to the substrate.

In another embodiment, the polymeric support may further comprise an antistatic layer to manage unwanted charge build up on the sheet or web during roll conveyance or sheet finishing. In another embodiment of this invention, the antistatic layer has a surface resistivity of between $10^5$ to $10^{12}$. Above $10^{12}$, the antistatic layer typically does not provide sufficient conduction of charge to prevent charge accumulation to the point of preventing fog in photographic systems or from unwanted point switching in liquid crystal displays. While layers greater than $10^5$ will prevent charge buildup, most antistatic materials are inherently not that conductive and in those materials that are more conductive than $10^5$, there is usually some color associated with them that will reduce the overall transmission properties of the display. The antistatic layer is separate from the highly conductive layer of ITO and provides the best static control when it is on the opposite side of the web substrate from that of the ITO layer. This may include the web substrate itself.

The functional layer may also comprise a dielectric material. A dielectric layer, for purposes of the present invention, is a layer that is not conductive or blocks the flow of electricity. This dielectric material may include a UV curable, thermoplastic, screen printable material, such as Electrodag 25208 dielectric coating from Acheson Corporation. The dielectric material forms a dielectric layer. This layer may include openings to define image areas, which are coincident with the openings. Since the image is viewed through a transparent substrate, the indicia are mirror imaged. The dielectric material may form an adhesive layer to subsequently bond a second electrode to the light modulating layer.

The dielectric material may form an adhesive layer to subsequently bond a second electrode to the light modulating layer. Conventional lamination techniques involving heat and pressure are employed to achieve a permanent durable bond. Certain thermoplastic polyesters, such as VITEL 1200 and 3200 resins from Bostik Corp., polyurethanes, such as MORTHANE CA-100 from Morton International, polyamides, such as UNIREZ 2215 from Union Camp Corp., polyvinyl butyral, such as BUTVAR B-76 from Monsanto, and poly(butyl methacrylate), such as ELVACITE 2044 from ICI Acrylics Inc. may also provide a substantial bond between the electrically conductive and light modulating layers.

The dielectric adhesive layer may be coated from common organic solvents at a dry thickness of one to three microns. The dielectric adhesive layer may also be coated from an aqueous solution or dispersion. Polyvinyl alcohol, such as AIRVOL 425 or MM-51 from Air Products, poly (acrylic acid), and poly(methyl vinyl ether/maleic anhydride), such as GANTREZ AN-119 from GAF Corp. can be dissolved in water, subsequently coated over the second electrode, dried to a thickness of one to three microns and laminated to the light modulating layer. Aqueous dispersions of certain polyamides, such as MICROMID 142LTL from Arizona Chemical, polyesters, such as AQ 29D from Eastman Chemical Products Inc., styrene/butadiene copolymers, such as TYLAC 68219-00 from Reichhold Chemicals, and acrylic/styrene copolymers such as RayTech 49 and RayKote 234L from Specialty Polymers Inc. can also be utilized as a dielectric adhesive layer as previously described.

In the present invention, curable materials may be applied to the support. The curable material may comprise any material that is curable and may be applied to form a coating. This may include materials that may require some chemical mechanism, such as crosslinking, to cure as well as evaporation of a carrier solvent. In one embodiment, the curable material may comprise a polymeric material. Coatings may include, but are not limited to, imageable layers, light modulating layers, conductive layers, color contrast layers, dielectric layers, and barrier layers. The curable material may be directly applied to the substrate or it may be applied with a carrier material that may be later removed to facilitate the curing process, such as a solvent.

The curable materials may be applied to the support by any method known by those of skill in the art to form a layer. Some exemplary methods may include screen printing, hopper coating, gravure printing, lithographic and photolithographic printing, spraying, and vapor depositing.

The curing process can occur by any means known to those of skill in the art of curing coatings, such as through application of light, heat, airflow, chemical reaction, or some other source of energy. Light activation of the curing process can occur through exposure to ultraviolet, visible, infrared light, or combinations thereof, which then initiates a chemical reaction to cure the materials, such as through crosslinking polymerizations.

The typical curing process takes place in several steps: (a) initiation, (b) machine conveyance curing, and (c) wound roll curing. There are two primary methods to cure the coatings: actinic and thermal. In actinic curing, polymerization of prepolymeric inks with less than 10% volatiles is initiated by the application of electromagnetic energy. UV wavelengths at less than 386 nanometers is used for this process. Dosage limits are 100 to 700 $mJ/cm^2$ with 300 to 500 $mJ/cm^2$ preferred. Temperature and air flow are standard for one skilled in the art. Machine curing does not substantially take place in UV curing; however, additional time is required to fully complete the process in the wound roll. Temperature limits are 10 to 100 with 20 to 30° C. preferred, humidity limits are 0 to 90% with 40 to 60% preferred, and air flow limits are 0 to 4000 fpm with 0 to 15 fpm preferred. The presence of any of a number of gases is useful to the process with air or nitrogen being preferred.

Thermally curable solvent coatings rely on diffusion and convection to drive off volatiles that can be up to 75% of the total coating. Initiation and conveyance curing take place by the application of elevated temperature gas moving along or across the web. Air conveyed technology is well known and standard practices exist for these processes. In the wound roll, drying does not usually continue; however, when the layers are spaced so that lap-to-lap contact does not take place, drying can continue. Temperature limits are 20 to 100° C. with 70 to 90° C. preferred, humidity limits are 20 to 60% with 30 to 50% preferred, and air flow limits are 0 to 4000 fpm with 0 to 15 fpm preferred.

The liquid crystal (LC) is used as an optical switch. The substrates are usually manufactured with transparent, conductive electrodes, in which electrical "driving" signals are coupled. The driving signals induce an electric field which can cause a phase change or state change in the LC material, the LC exhibiting different light reflecting characteristics. In one embodiment of an LCD 10, illustrated in FIG. 1, a transparent, multilayer flexible support 15 is coated with a first conductive layer 20, which may be patterned, onto which is coated the light modulating liquid crystal layer 30. Light modulating layer 30 overlays a first portion of first transparent conductor(s) 20 and has an exposed portion, exposed first conductor 20' to provide electrical contact to first transparent conductors 20. Light modulating layer 30 contains cholesteric liquid crystal material. Application of electrical fields of various intensity and duration can be employed to drive a chiral nematic material (cholesteric) into a reflective state, to a light scattering state, or an intermediate state. These materials have the advantage of having first and second optical states that are both stable in the absence of an electrical field. The materials can maintain a given optical state indefinitely after the field is removed. A second conductive layer 40 is applied and overcoated with a dielectric layer 42 to which dielectric conductive row contacts 44 are attached, including vias that permit interconnection between conductive layers and the dielectric conductive row contacts. An optional nano-pigmented functional layer may be applied between the liquid crystal layer 30 and the second conductive layer 40. In FIG. 1, second conductors 40 overlay dark light absorbing layer 35, comprising nonconductive colorants and conductive colorant, wherein the conductive colorant is limited to an amount less than 25% by weight. Second conductors 40 have sufficient conductivity to induce an electric field between the first and second conductors across light modulating layer 30 strong enough to change the optical state of the polymeric material. Second conductors 40 can be formed, for example, by the well known technique of vacuum deposition for forming a layer of conductive material such as aluminum, tin, silver, platinum, carbon, tungsten, molybdenum, tin or indium or combinations thereof. The layer of conductive material can be patterned using well known techniques of photolithography, laser etching or by application through a mask.

Again referring to embodiment of FIG. 1, a dielectric layer 42 can be provided over second conductors 40. The dielectric layer 42 is provided with via that permit interconnection between second conductors 40 and conductive row contacts 44. The dielectric layer 42 can be formed, for example, by printing or coating a polymer such as vinyl dissolved in a solvent. Providing sufficient amount of polymer to pigment in dark layer 35 creates a printable surface on dark layer 35. Row contacts 44 can be formed by screen printing the same screen printable, electrically conductive material used to form second conductors 40. The row contacts 44 enable the connection of sets of second conductors 40 to create functional rows of electrically addressable areas in the polymer dispersed layer. The row contacts and the exposed first conductors 20' form a set of backside display contacts that are used to electrically address the display.

In one embodiment of this invention, the dark layer 35 of FIG. 1 is positioned on the side opposing the incident light. In the fully evolved focal conic state, the cholesteric liquid crystal is light scattering and incident light is scattered to and absorbed by dark layer 35 to create the appearance of a black image. Progressive evolution towards the focal conic state causes a viewer to perceive reflected light that transitions to black as the cholesteric material changes from reflective planar state to a fully evolved light scattering focal conic state. When the field is removed, light modulating layer maintains a given optical state indefinitely. The states are more fully discussed in U.S. Pat. No. 5,437,811, incorporated herein by reference.

If the indices of refraction between the polymers used in light modulating layer 30 and dark layer 35 in FIG. 1 do not match, some incident light is reflected back as back scatter light when light modulating layer 30 is in the focal conic state. Therefore, it is highly desirable to have the same index of refraction in both polymeric binders. It is also highly desirable for the index of refraction of the first transparent conductor and the dark layer to be substantially the same. Back scatter light reduces light absorbance, creating a gray image instead of a black image. Incident light passing through light modulating layer 30 in the focal conic state is very effectively absorbed by the light absorbing dark layer, containing dispersed submicron (nano-particle) conductive colorant, most preferably carbon pigment, and nonconductive colorant in a polymer (gelatin), wherein the polymer utilized is common with light modulating layer 30, eliminating back scatter light.

Another embodiment of a usable display comprises a first transparent conductor on a transparent substrate with a continuous unpatterned layer of transparent conductive material that covers the entire surface of the display. A light modulating layer covers the first transparent conductor. A dielectric layer is formed by printing over the light modulating layer, with gaps in the form of indicia acting as via. Second conductors are separate blocks of conductive material that cover the via. The areas of the light modulating layer under the via will be responsive to an electrical field formed between the first transparent conductor and the second conductor. Layers are removed down to the first transparent conductor to create exposed conductors, which are printed over by conductive material to create a single column contact. The dark light absorbing layer provides an opaque surface that conceals gaps between the second conductors and column contacts.

The through via may be in the shape of indicia, such as an alpha-numeric character or a symbol. The dielectric layer is thick enough to separate second conductor from first transparent conductor so that light modulating layer is unresponsive to an electrical field applied between first transparent conductor and second conductor, for instance, 25 microns. A writing field is sufficient to change the state of light modulating layer in the absence of the dielectric layer. At through via, the first transparent conductor and second conductors are in close proximity to light modulating layer and can change optical state by application of a voltage across the conductors.

The dark layer, comprising nonconductive colorants and conductive colorant, wherein the conductive colorant is limited to an amount less than 25% by weight, disposed between the second conductors and the light modulating layer, preferably is a thin as is possible, and should provide high light absorption, preferable greater than 1.50 Optical Density.

In another embodiment, the display may have layers above the first transparent conductor, including a dark layer, which are removed to create exposed first conductor. Conductive material may be printed over the first transparent conductor to create a single column contact. The optical state of indicia are changed by applying fields to the first transparent conductor through column contacts and to individual connections to each second conductor.

In a preferred embodiment, the dark layer 35 comprises milled nonconductive pigments. The materials are milled below 1 micron to form "nano-pigments". Such pigments are effective in absorbing wavelengths of light in very thin (sub micron) layers. In a preferred embodiment, dark layer 35 absorbs all wavelengths of light across the visible light spectrum (400 nanometers to 700 nanometers wavelength).

Referring again to FIG. 1, dark layer 35 of FIG. 1 is coated over light modulating layer 30 to provide a light absorbing layer which provides a high contrast dark state to reflected light. The coating of dark layer 35 can be simultaneous with the deposition of light modulating layer 30 or as a separate step. In a preferred embodiment, multilayer photographic coating equipment provides light modulating layer 30 and dark layer 35 as two co-deposited layers. Light modulating layer 30 in the preferred embodiment is approximately 9 microns thick. In the invention, dark layer 35 has an optical density of 2.0, is less than or equal to 0.50 microns in thickness, and does not carry electrical fields outside areas defined by two conductors. Under these conditions, dark layer 35 is significantly thinner than light modulating layer 30 and has minimal effect on the electrical field strength required to change cholesteric material state.

Figure 3:
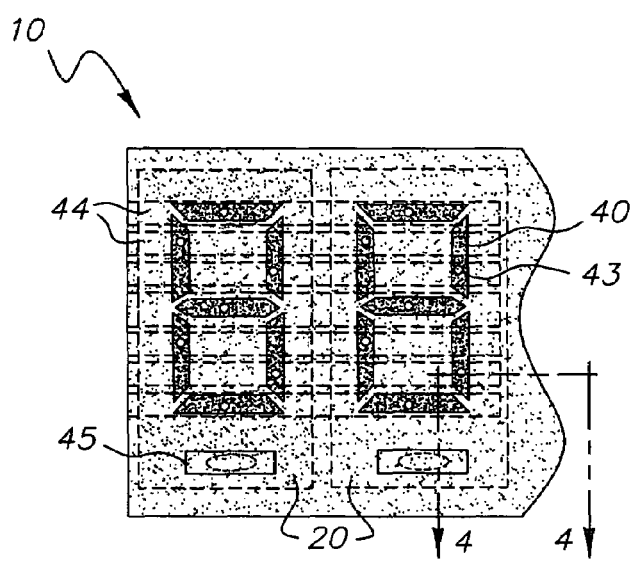
FIG. 3 is a top view of a seven segment display having the structure shown in FIG. 1.
Figure 4:
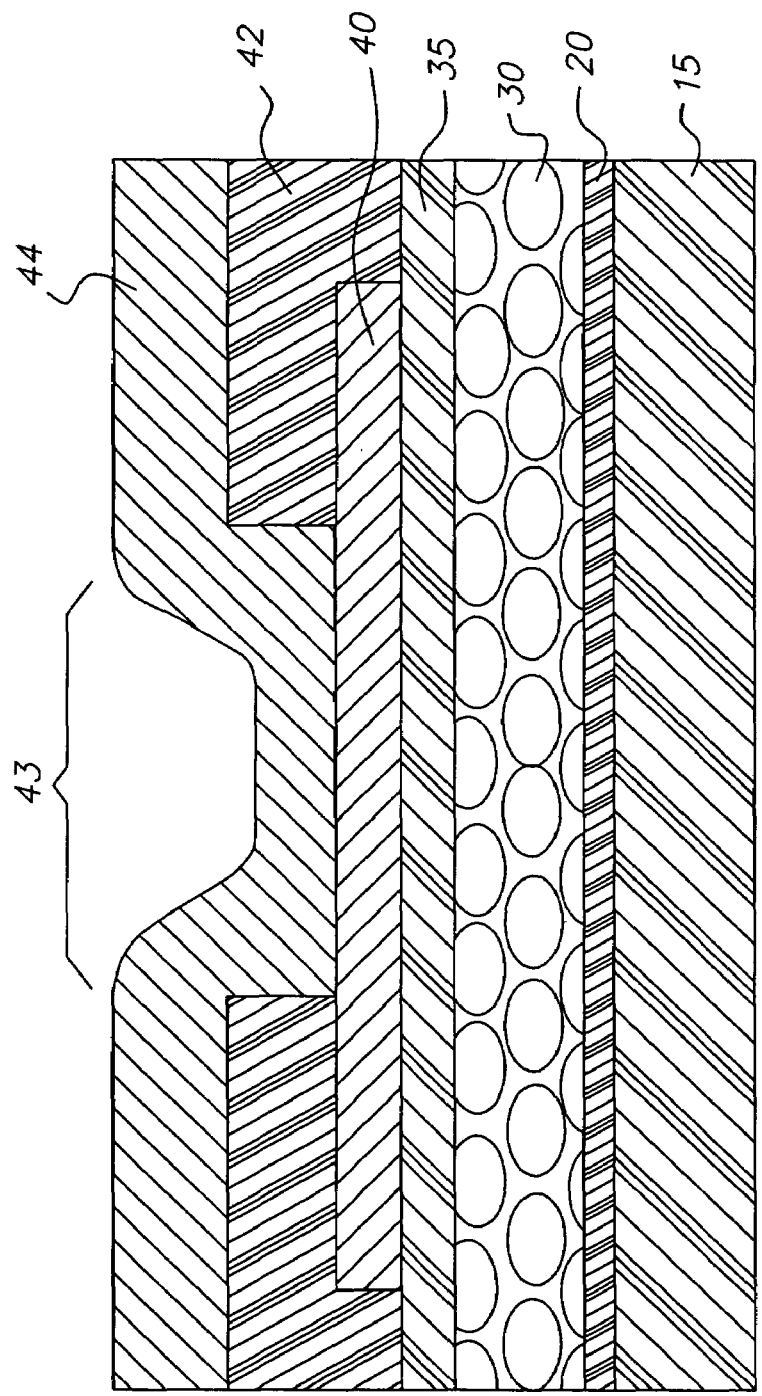
FIG. 4 is a partial cross sectional view of the display of FIG. 3 taken along lines A—A in FIG. 3 at a gap in the dielectric layer.

Referring to FIGS. 3 and 4 in conjunction, a seven segment display useable with the present invention and having the structure shown generally in FIG. 1 will be described. First transparent conductors 20 over a transparent substrate 15 are comprised of a patterned layer of conductive material to form one common conductor for each 7 segment character. FIG. 4 shows a partial cross sectional view of the display of FIG. 3 taken along lines A—A at a gap in the dielectric layer 42. Light modulating layer 30 is overcoated with dark layer 35. Conductive material is used to print individual second conductors 40 for each segment on display 10 over dark layer 35. The ratio of gelatin to nano-pigment is controlled so that there is good adhesion of second conductors 40 to dark layer 35. Dielectric layer 42 covers all of the individual second conductors 40, and through via 43 in dielectric layer 42 allow each second conductor 40 to be connected to a printed row contact 44. Row contacts 44 connect the commonly positioned segments in all of the 7 segment characters together. Materials above first transparent conductor, including the dark light absorbing layer, have been removed to create exposed first conductor 20'. Conductive material is printed over exposed first conductor 20' to form column contacts 45. The completed display 10 in this embodiment includes a set of 7 segment characters connected to form a matrix display. Second conductors in seven segment displays are separated from each other, and require operative material be limited to areas defined by the intersection of first and second conductors.

Figure 5:
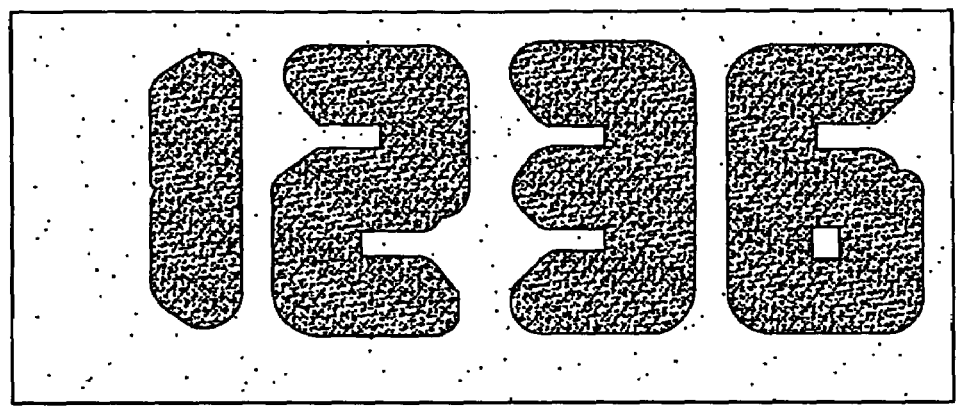
FIG. 5 is a comparative written seven segment display having a conductive dark layer.
Figure 6:
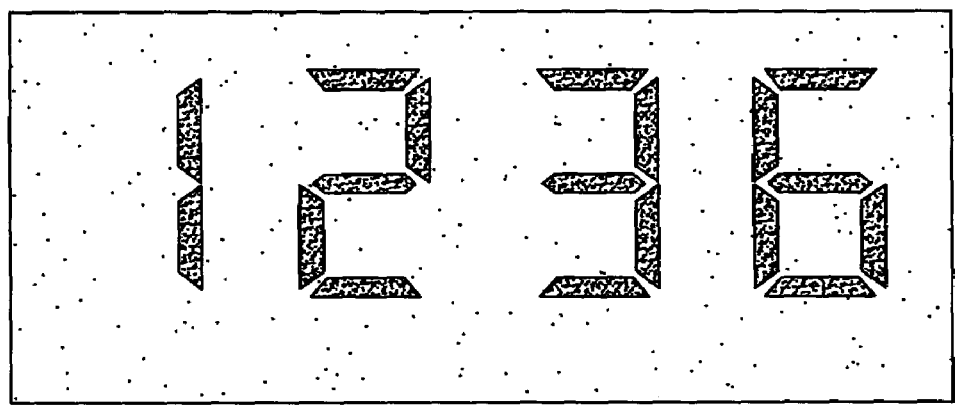
FIG. 6 is a written seven segment display in accordance with the present invention having a blended pigment-containing dark layer.

For comparison to the present invention, FIG. 5 is an exemplary written seven segment display having a dark layer. The dark layer in FIG. 5 is made with a field-conductive colorant, preferably carbon, in a polymer binder. In a conventional dark layer, made with carbon in a polymer binder, the carbon functions as electrically non-conductive, but a field-carrying material. The field carrying dark layer carries applied electrical fields outside the perimeter formed by the intersection of first transparent conductors and second conductors. Cholesteric material in light modulating layer outside the defined areas responds to the expanded electrical field, and changes state outside areas defined by the two conductors and is referred to as electrical field blooming. The segments of the display are blurred, degrading the legibility of indicia in displays. FIG. 6 is a written seven segment display in accordance with the present invention having a nonconductive dark layer formed of nano-pigment particles. The blurry characters in FIG. 6 can be compared with well defined characters of the display with the combined colorants in the dark light absorbing layer in FIG. 6. It is advantageous to use materials in a manner that produces reduced electrical field blooming.

Another aspect of the present invention relates to a processing method involving sequentially or simultaneously depositing coatings of the state changing layer and the dark layer prior to applying the second conductor. It is especially advantageous to employ substantially aqueous coatings of the state changing layer and the dark layer. Preferably, the state changing layer and the dark layer both comprise gelatin as a binder. It is especially advantageous for the state changing layer and the dark layer to be simultaneously coated. Furthermore, the transparent first conductor, for example made from polythiophene or other coatable conductor material, can be coated simultaneously with the state changing layer and the dark layer.

In one embodiment, the display is in the form of a web that is sequentially moved through one or more stations which sequentially or simultaneously deposits the state changing layer and the nonconductive, non field spreading layer. The first transparent conductor can be indium-tin oxide or other suitable material that is sputtered to form the desired conductor pattern over the transparent support prior to sequentially or simultaneously depositing the state changing layer and the nonconductive, non field spreading layer. In another embodiment of the invention, the first and second conductors in the display can be patterned to produce an addressable matrix.

The following examples are provided to illustrate the invention. A series of dark layer dispersions were prepared as follows:

EXAMPLE 1

Invention Embodiment

This example illustrates the preparation of pigment dispersions suitable for use in the dark layer of a display according to the present invention. A dispersion of colorant Pigment Yellow 4G was made by combining 50 g Pigment Yellow 4G VP2532 (Sun Chemical Corp.), 602.5 g of a 10 wt % aqueous solution of n-methyl-n-oleoyl taurate potassium salt, 137.5 g deionized water, and 625 ml 1.8 mm zirconium oxide beads in a 1250 ml glass jar. The mixture was rolled on a roller mill at a speed of 83 ft/min for 5 days. After milling, the dispersion was diluted with high purity water. The final dispersion contained 18% pigment by weight, with an average particle size less than 0.2 microns. The dry coverage of the yellow pigment for this example is was 0.03 g/m$^2$.

A set of experimental dispersions were made of various pigment colorants milled to less than a micron mean diameter. A dispersion of colorant Pigment Blue 15:3 was made by combining 50 g Sunfast Blue.RTM. Pigment Blue 15:3 (Sun Chemical Corp), 602.5 g of a 10 wt % aqueous solution of n-methyl-n-oleoyl taurate potassium salt, 137.5 g deionized water, and 625 ml 1.8 mm zirconium oxide beads in a 1250 ml glass jar. The mixture was rolled on a roller mill at a speed of 83 ft/min for 5 days. After milling, the dispersion was diluted with high purity water. The final dispersion contained 18% pigment by weight, with an average particle size less than 0.2 microns. The dry coverage of the cyan pigment for this example is was 0.16 g/m$^2$.

A dispersion of colorant Pigment Red 122 was made by combining 50 g Sunfast.RTM. Magenta Pigment Red 122 (Sun Chemical Corp.), 602.5 g of a 10 wt % aqueous solution of n-methyl-n-oleoyl taurate potassium salt, 137.5 g deionized water, and 625 ml 1.8 mm zirconium oxide beads in a 1250 ml glass jar. The mixture was rolled on a roller mill at a speed of 83 ft/min for 5 days. After milling, the dispersion was diluted with high purity water. The final dispersion contained 16% pigment by weight, with an average particle size less than 0.2 microns. The dry coverage of the magenta pigment for this example is was 0.15 g/m$^2$.

A dispersion of colorant Carbon Black (Sun Chemical Corp.) was made by combining 50 g of Carbon Black, 602.5 g of a 10 wt % aqueous solution of n-methyl-n-oleoyl taurate potassium salt, 137.5 g deionized water, and 625 ml 1.8 mm zirconium oxide beads in a 1250 ml glass jar. The mixture was rolled on a roller mill at a speed of 83 ft/min for 5 days. After milling, the dispersion was diluted with high purity water. The final dispersion contained 13% pigment by weight, with an average particle size less than 0.2 microns. The dry coverage of the carbon colorant for this example is was 0.11 g/m².

In this example, the conductive carbon colorant comprised approximately 25% pigment coverage.

EXAMPLE 2

Control

This example illustrates the preparation of pigment dispersions suitable for use in the dark layer of a display. A dispersion of colorant Pigment Yellow 4G was made by combining 50 g Pigment Yellow 4G VP2532 (Sun Chemical Corp.), 602.5 g of a 10 wt % aqueous solution of n-methyl-n-oleoyl taurate potassium salt, 137.5 g deionized water, and 625 ml 1.8 mm zirconium oxide beads in a 1250 ml glass jar. The mixture was rolled on a roller mill at a speed of 83 ft/min for 5 days. After milling, the dispersion was diluted with high purity water. The final dispersion contained 18% pigment by weight, with an average particle size less than 0.2 microns. The dry coverage of the yellow pigment for this example is was 0.04 g/m².

A set of experimental dispersions were made of various pigments milled to less than a micron mean diameter. A dispersion of colorant Pigment Blue 15:3 was made by combining 50 g Sunfast.Blue. RTM Pigment Blue 15:3 (Sun Chemical Corp), 602.5 g of a 10 wt % aqueous solution of n-methyl-n-oleoyl taurate potassium salt, 137.5 g deionized water, and 625 ml 1.8 mm zirconium oxide beads in a 1250 ml glass jar. The mixture was rolled on a roller mill at a speed of 83 ft/min for 5 days. After milling, the dispersion was diluted with high purity water. The final dispersion contained 18% pigment by weight, with an average particle size less than 0.2 microns. The dry coverage of the cyan pigment for this example is was 0.21 g/m².

A dispersion of colorant Pigment Red 122 was made by combining 50 g Sunfast.RTM. Magenta Pigment Red 122 (Sun Chemical Corp.), 602.5 g of a 10 wt % aqueous solution of n-methyl-n-oleoyl taurate potassium salt, 137.5 g deionized water, and 625 ml 1.8 mm zirconium oxide beads in a 1250 ml glass jar. The mixture was rolled on a roller mill at a speed of 83 ft/min for 5 days. After milling, the dispersion was diluted with high purity water. The final dispersion contained 16% pigment by weight, with an average particle size less than 0.2 microns. The dry coverage of the magenta pigment for this example is was 0.20 g/m².

A dispersion of colorant Carbon Black was made by combining 50 g (Sun Chemical Corp.), 602.5 g of a 10 wt % aqueous solution of n-methyl-n-oleoyl taurate potassium salt, 137.5 g deionized water, and 625 ml 1.8 mm zirconium oxide beads in a 1250 ml glass jar. The mixture was rolled on a roller mill at a speed of 83 ft/min for 5 days. After milling, the dispersion was diluted with high purity water. The final dispersion contained 13% pigment colorant by weight, with an average particle size less than 0.2 microns. The dry coverage of the carbon pigment colorant for this example is was 0.0 g/m².

In this example, the conductive carbon pigment colorant comprised 0% pigment coverage.

EXAMPLE 3

Control

This example illustrates the preparation of pigment dispersions suitable for use in the dark layer of a display. A set of experimental dispersions were made of various pigments milled to less than a micron mean diameter. A dispersion of colorant Pigment Blue 15:3 was made by combining 50 g Sunfast Blue.RTM. Pigment Blue 15:3 (Sun Chemical Corp), 602.5 g of a 10 wt % aqueous solution of n-methyl-n-oleoyl taurate potassium salt, 137.5 g deionized water, and 625 ml 1.8 mm zirconium oxide beads in a 1250 ml glass jar. The mixture was rolled on a roller mill at a speed of 83 ft/min for 5 days. After milling, the dispersion was diluted with high purity water. The final dispersion contained 18% pigment by weight, with an average particle size less than 0.2 microns. The dry coverage of the cyan pigment for this example is was 0.16 g/m².

A dispersion of colorant Pigment Red 122 was made by combining 50 g Sunfast.RTM. Magenta Pigment Red 122 (Sun Chemical Corp.), 602.5 g of a 10 wt % aqueous solution of n-methyl-n-oleoyl taurate potassium salt, 137.5 g deionized water, and 625 ml 1.8 mm zirconium oxide beads in a 1250 ml glass jar. The mixture was rolled on a roller mill at a speed of 83 ft/min for 5 days. After milling, the dispersion was diluted with high purity water. The final dispersion contained 16% pigment by weight, with an average particle size less than 0.2 microns. The dry coverage of the magenta pigment for this example is was 0.10 g/m².

A dispersion of colorant Carbon Black was made by combining 50 g (Sun Chemical Corp.), 602.5 g of a 10 wt % aqueous solution of n-methyl-n-oleoyl taurate potassium salt, 137.5 g deionized water, and 625 ml 1.8 mm zirconium oxide beads in a 1250 ml glass jar. The mixture was rolled on a roller mill at a speed of 83 ft/min for 5 days. After milling, the dispersion was diluted with high purity water. The final dispersion contained 13% pigment by weight, with an average particle size less than 0.2 microns. The dry coverage of the carbon colorant pigment for this example is was 0.19 g/m².

In this example, the conductive carbon colorant comprised 43% pigment coverage.

EXAMPLE 4

Control

This example illustrates the preparation of pigment dispersions suitable for use in the dark layer of a display. A dispersion of colorant Carbon Black was made by combining 50 g (Sun Chemical Corp.), 602.5 g of a 10 wt % aqueous solution of n-methyl-n-oleoyl taurate potassium salt, 137.5 g deionized water, and 625 ml 1.8 mm zirconium oxide beads in a 1250 ml glass jar. The mixture was rolled on a roller mill at a speed of 83 ft/min for 5 days. After milling, the dispersion was diluted with high purity water. The final dispersion contained 13% pigment by weight, with an average particle size less than 0.2 microns. The dry coverage of the carbon colorant for this example is was 0.45 g/m².

In this example, the carbon pigment colorant comprised 100% pigment coverage.

Figure 7:
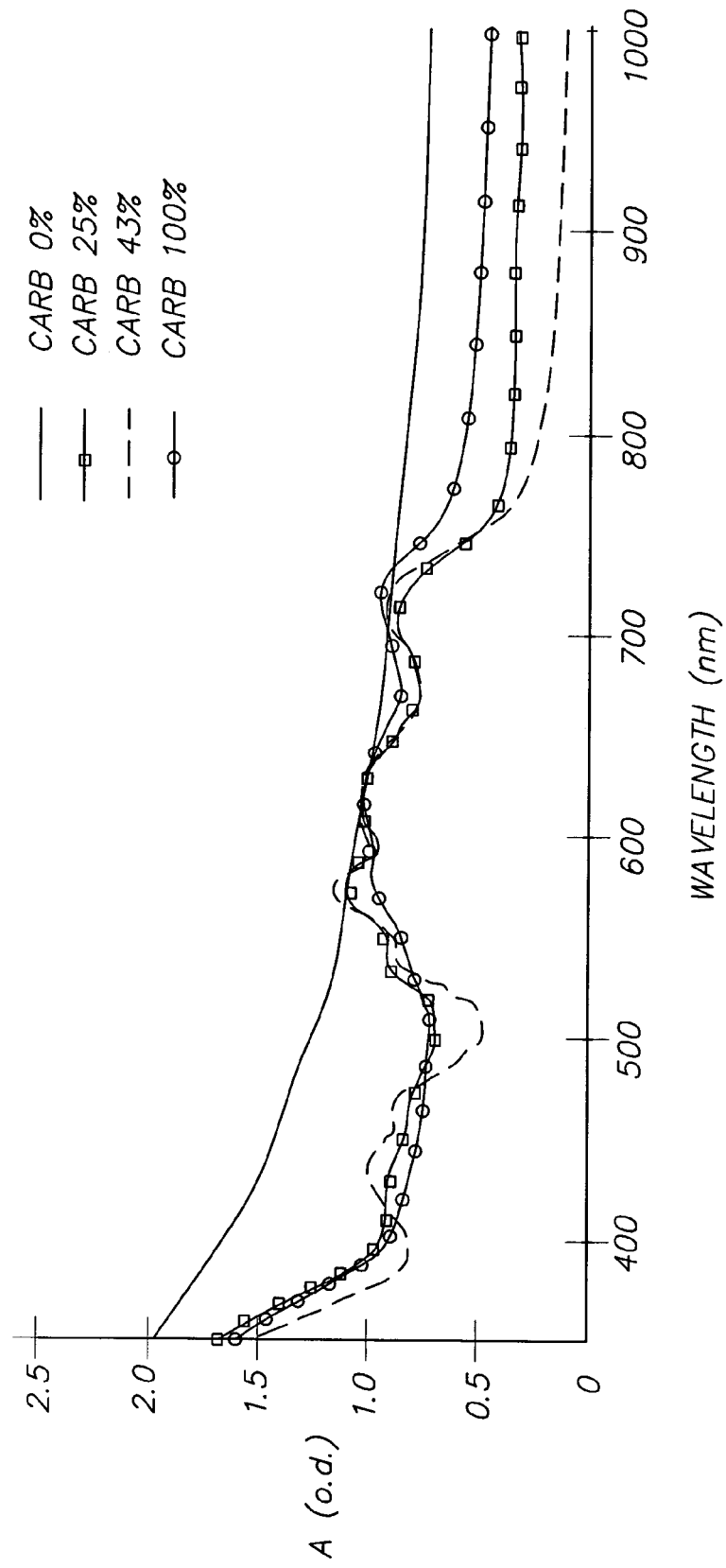
FIG. 7 illustrates the absorption spectra for a series of dark layers having increasing carbon weight fraction of total pigment.

Each of the example dispersions was spun coat onto 2-inch glass slides at 5000 revolutions per minute. The absorption spectra of the dried samples were obtained using a Perkin Elmer Lambda 12 spectrophotometer in dual beam transmission mode with a blank glass slide as a reference. The resulting spectra are shown in FIG. 7.

The coating solution was heated to 45° C., which reduced the viscosity of the emulsion to approximately 90 centipoises. It was coated at 9.69 ml/m².

The emulsion was coated onto a sheet of polyethylene terephthalate substrate with 125-micron thickness and 5-inch width having an Indium Tin Oxide conductive layer ("ITO") of 300 ohms per square that had a previously coated pack of an emulsion of cholesteric liquid crystal oil (BL118® from E. M. Merck, Inc. Hawthorne, N.Y., U.S.A.) and gelatin that was produced according to the methods disclosed in U.S. Pat. No. 6,556,262 to Stephenson et al. The aqueous coating that was prepared as described above, contained 8 weight percent of liquid crystal, 5 weight percent gelatin, and about 0.2 weight percent of a coating surfactant.

EXAMPLE 5

Invention Embodiment

Example 5 was prepared the same as Example 1, except the conductive carbon pigment colorant comprised approximately 25% pigment coverage.

Five displays were prepared by over coating a liquid crystal layer with each of the five examples described above, respectively. After drying, a second conductor of as Electrodag 423SS screen printable electrical conductive material from Acheson Corporation was printed over the liquid crystal layer. Such printed materials are finely divided graphite particles in a thermoplastic resin.

Voltage pulses were applied to the displays to switch between planar and focal conic states. The applied voltage had a frequency of 1 kHz. 120 volts was used to switch into the planar texture and 80 volts was applied to switch to the focal conic texture. After writing into the planar state, field blooming was observed, when present, as an unwanted darkening of the display in the area immediately surrounding the conductive patch. The results of field blooming are summarized in the table below.

TABLE 1

Results of Field Blooming

| Example | Carbon (by weight percentage) | Field Blooming | Color shifts away from neutral under different lighting conditions |
|---|---|---|---|
| 2 | 0 | No | Yes |
| 1 | 25 | No | No |
| 3 | 43 | Yes | No |
| 4 | 100 | Yes | No |
| 5 | 22 | No | No |

As this table demonstrates, the addition of a small amount of conductive colorant, in this case carbon pigment, to the dark light absorbing layer allows for two improvements to the existing technology. The addition of no more than about 25% by weight of conductive pigment, preferably carbon, causes no apparent field blooming of the chiral nematic liquid crystal display. This series also shows that increasing the conductive colorant fraction improves the neutrality of the dark layer independent of lighting conditions by reducing the spectral holes particularly at about 505 nm for the case presented here, illustrated in FIG. 7. It is also evident that the unwanted absorption below 400 nm and above 700 nm is less for the blended system, comprising nonconductive pigments and conductive pigment, wherein the conductive pigment is limited to less than 25% by weight, than for carbon alone.

The invention has been described in detail with particular reference to certain preferred embodiments thereof, but it will be understood that variations and modifications can be effected within the spirit and scope of the invention.

The invention claimed is:

1. A display comprising a substrate, an electrically modulated imaging layer, a first transparent conductive layer, and a dark light absorbing layer comprising a binder and a blend of nonconductive colorants and conductive colorants, wherein said conductive colorant is present in an amount less than 25% by weight.

2. The display of claim 1 wherein said substrate is flexible.

3. The display of claim 1 wherein said substrate is transparent.

4. The display of claim 3 wherein said transparent substrate comprises polyester.

5. The display of claim 3 wherein said transparent substrate comprises polycarbonate.

6. The display of claim 3 wherein said transparent substrate comprises polyethylene naphthalate (PEN).

7. The display of claim 3 wherein said transparent substrate comprises acetate.

8. The display of claim 3 wherein said transparent substrate comprises polyethersulfone.

9. The display of claim 3 wherein said transparent substrate comprises at least one member selected from the group consisting of polyolefin, polyester, polycarbonate, acetate, cyclic polyolefin, polyethersulfone, and polyamide.

10. The display of claim 1 wherein the imaging layer comprises a polymer dispersed cholesteric liquid crystal layer.

11. The display of claim 10 wherein said polymer is gelatin.

12. The display of claim 10 wherein said polymer is water soluble.

13. The display of claim 1 wherein said electrically conductive layer a surface conductivity of less than $10^4$ ohms/sq.

14. The display of claim 1 wherein said at least one conductive layer is patterned with actinic radiation.

15. The display of claim 1 wherein said conductive layer comprises ITO.

16. The display of claim 1 wherein said binder comprises gelatin.

17. The display of claim 1 wherein said dark light absorbing layer has a thickness less than 1.0 micron.

18. The display of claim 1 wherein the thickness of said dark light absorbing layer is less that 25% of the said electrically modulated imaging layer.

19. The display of claim 1 wherein said dark light absorbing layer has an optical density greater than 1.0.

20. The display of claim 1 wherein said dark light absorbing layer has an optical density of 1.5 or greater.

21. The display of claim 1 wherein said dark light absorbing layer comprises a combination of at least two nonconductive colorants which have different hues.

22. The display of claim 1 wherein said dark light absorbing layer comprises a combination one, two, or three different nonconductive colorants which have different hues.

23. The display of claim 1 wherein said dark light absorbing layer comprises cyan, magenta, and yellow nonconductive colorants.

24. The display of claim 1 wherein said dark light absorbing layer comprises a combination of nonconductive colorants that provide a substantially neutral hue.

25. The display of claim 1 wherein said nonconductive colorant is pigment.

26. The display of claim 25 wherein said pigment comprises a particle having a median particle diameter of less than 2 microns.

27. The display of claim 25 wherein said pigment comprises a particle having a median particle diameter of between 0.01 and 0.5 microns.

28. The display of claim 25 wherein said pigment comprises a particle having a median particle diameter of less than 50 percent of the thickness of the dark light absorbing layer.

29. The display of claim 1 wherein said conductive colorant comprises carbon.

30. The display of claim 1 wherein said dark light absorbing layer comprises an amount of said conductive colorant greater than 0 but less than or equal to 22% by weight.

31. The display of claim 1 wherein the ratio of said nonconductive colorant to said conductive colorant varies from 99.9:0.01 to 75:25.

32. The display of claim 1 wherein said binder to colorant ratio varies from 99:99:0.01 to 50:50.

33. The display of claim 1 wherein said binder to colorant ratio is 1:1.

34. The display of claim 1 wherein said dark light absorbing layer provides a background that is substantially neutral to the human eye.

35. The display of claim 1 wherein said dark light absorbing layer provides a background that provides a substantially neutral optical density such that there is variability of less than +/−20% from the mean optical density over at least 80% of the visible spectrum from 400 to 700 nm.

36. The display of claim 1 wherein the respective indices of refraction of said first conductive layer and said dark light absorbing layer are substantially the same.

37. The display of claim 1 further comprising at least a second electrically conductive layer, wherein said electrically modulated imaging layer and said dark light absorbing layer are between said first conductive layer and said second conductive layer conductive layer.

38. The display of claim 1 wherein the layer most opposite said substrate is black.

* * * * *

UNITED STATES PATENT AND TRADEMARK OFFICE
CERTIFICATE OF CORRECTION

| | |
|---|---|
| PATENT NO. | : 7,195,813 B2 |
| APPLICATION NO. | : 10/851566 |
| DATED | : March 27, 2007 |
| INVENTOR(S) | : Mitchell S. Burberry et al. |

It is certified that error appears in the above-identified patent and that said Letters Patent is hereby corrected as shown below:

Claim 37, line 5    after "second conductive layer" delete "conductive layer"

Signed and Sealed this

Twenty-ninth Day of April, 2008

JON W. DUDAS
*Director of the United States Patent and Trademark Office*

UNITED STATES PATENT AND TRADEMARK OFFICE
CERTIFICATE OF CORRECTION

PATENT NO. : 7,195,813 B2  
APPLICATION NO. : 10/851566  
DATED : March 27, 2007  
INVENTOR(S) : Mitchell S. Burberry et al.

Page 1 of 1

It is certified that error appears in the above-identified patent and that said Letters Patent is hereby corrected as shown below:

Column 38, Claim 37, line 15        after "second conductive layer" delete "conductive layer"

This certificate supersedes the Certificate of Correction issued April 29, 2008.

Signed and Sealed this

Twentieth Day of May, 2008

JON W. DUDAS  
*Director of the United States Patent and Trademark Office*